(12) United States Patent
Coakley et al.

(10) Patent No.: US 8,646,834 B2
(45) Date of Patent: Feb. 11, 2014

(54) VEHICLE BODY STRUCTURE

(75) Inventors: David Coakley, Macomb Township, MI (US); John-Paul LaPorte, Farmington Hills, MI (US); Michael Kowaczyk, Waterford, MI (US); Adam Jones, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 136 days.

(21) Appl. No.: 13/414,226

(22) Filed: Mar. 7, 2012

(65) Prior Publication Data

US 2013/0234474 A1    Sep. 12, 2013

(51) Int. Cl.
B62D 25/06    (2006.01)

(52) U.S. Cl.
USPC ............... 296/210; 296/146.8; 296/146.11; 296/1.08

(58) Field of Classification Search
USPC ............ 296/146.8, 146.11, 1.08, 210, 213; 52/716.5, 716.6, 716.7
See application file for complete search history.

(56) References Cited

U.S. PATENT DOCUMENTS

| | | | |
|---|---|---|---|
| 3,729,223 A | 4/1973 | Leissa | |
| 4,908,908 A | 3/1990 | Mitsuoka et al. | |
| 7,021,698 B2 | 4/2006 | Yamada et al. | |
| 7,618,084 B2 | 11/2009 | Kimura | |
| 7,669,916 B2 | 3/2010 | Munenaga et al. | |
| 7,690,715 B2 | 4/2010 | Hakamata et al. | |
| 8,256,825 B1* | 9/2012 | Dryja | 296/146.8 |
| 2005/0046229 A1* | 3/2005 | Yamada et al. | 296/146.8 |
| 2008/0073929 A1 | 3/2008 | Kimura | |
| 2013/0234461 A1* | 9/2013 | Coakley et al. | 296/1.08 |
| 2013/0234462 A1* | 9/2013 | Coakley et al. | 296/1.08 |

FOREIGN PATENT DOCUMENTS

| | | |
|---|---|---|
| JP | 61-189964 | 11/1986 |
| JP | 61-189964 U | 11/1986 |
| JP | 02-076517 | 6/1990 |
| JP | 02-076517 U | 6/1990 |
| JP | 02-076519 | 6/1990 |
| JP | 02-076519 U | 6/1990 |
| JP | 2000-071776 | 3/2000 |
| JP | 2005-075221 | 3/2005 |
| JP | 2006-321417 | 11/2006 |
| JP | 2007-118866 | 5/2007 |
| JP | 2007-176300 | 7/2007 |
| JP | 2007-290566 | 11/2007 |
| JP | 2008-013017 | 1/2008 |
| JP | 2008-013018 | 1/2008 |

* cited by examiner

Primary Examiner — Jason S Morrow
(74) Attorney, Agent, or Firm — Global IP Counselors, LLP

(57) ABSTRACT

A vehicle body structure includes a roof ditch that is defined by a recessed support surface, first and second wall surfaces that extend longitudinally along sides of the recessed support surface. A cover includes a top portion that spans a width of the roof ditch between respective top edges thereof. The cover includes a cover attachment section and a molding attachment section. The cover attachment section couples the cover at a fixed position relative to the vehicle body panel. A molding member extends in a lengthwise direction along the roof ditch between the first and second wall surfaces. The molding member includes an attachment member mating with the molding attachment section of the cover to form a lengthwise movement connection that retains the cover to the molding member with a predetermined amount of movement along the lengthwise direction of the roof ditch.

20 Claims, 18 Drawing Sheets

US 8,646,834 B2

VEHICLE BODY STRUCTURE

BACKGROUND

1. Field of the Invention

The present invention generally relates to a vehicle body structure. More specifically, the present invention relates to a vehicle body structure that includes a roof ditch and a molding assembly that covers and conceals the roof ditch.

2. Background Information

Most vehicles have seams defined between a roof panel and side panels. In recent model vehicles, this seam has been formed in a concave area at the side of the roof referred to as a roof ditch. In many such vehicles with roof ditches, a pair molding members or molding assemblies are used to cover or conceal the roof ditch. These molding members are typically flush with surfaces of the roof panel and side panels.

SUMMARY

One object is to provide a vehicle body structure with a molding assembly for a roof ditch that allows for thermal expansion and contraction of the molding assembly relative to the vehicle roof panel and side panels.

In view of the state of the known technology, one aspect of the present disclosure is to provide a vehicle body structure with at least one vehicle body panel that includes a roof ditch defined by a recessed support surface, a first wall surface extending longitudinally along a first side of the recessed support surface and a second wall surface extending longitudinally along a second side of the recessed support surface, with the second wall surface being disposed outboard of the first wall surface. A cover including a top portion spans a width of the roof ditch between respective top edges of the first and second wall surfaces. The cover further includes a cover attachment section and a molding attachment section, the cover attachment section coupling the cover at a fixed position relative to the vehicle body panel. A molding member extends in a lengthwise direction along the roof ditch between the first and second wall surfaces of the roof ditch. The molding member includes an attachment member mating with the molding attachment section of the cover to form a lengthwise movement connection that retains the cover to the molding member with a predetermined amount of movement along the lengthwise direction of the roof ditch.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
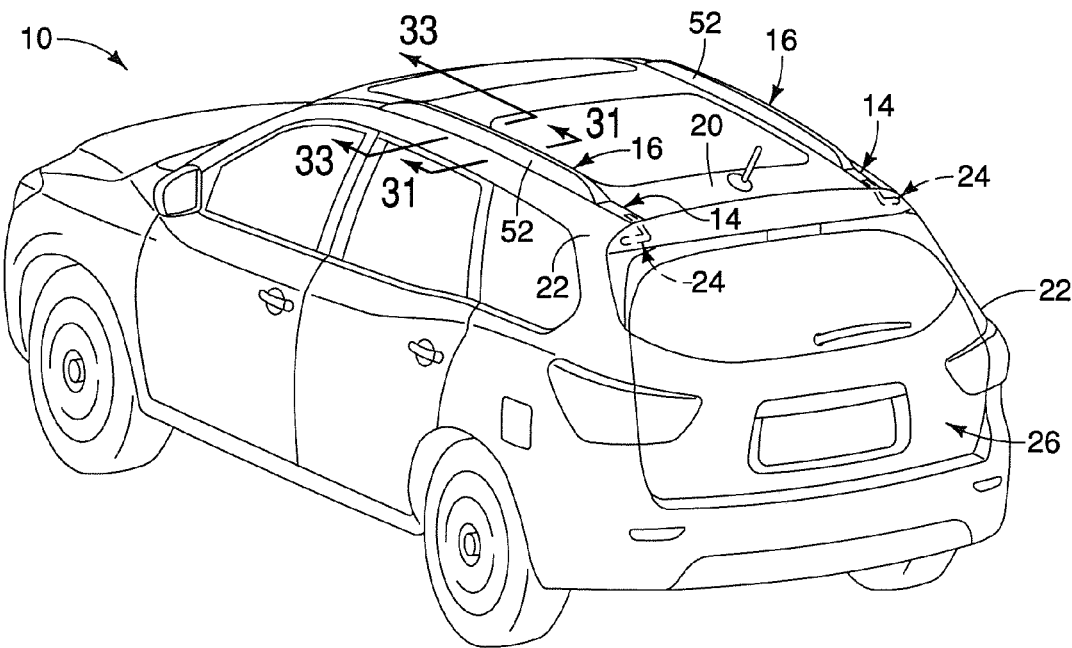
FIG. 1 is a perspective view of a vehicle that includes a vehicle body structure with a roof ditch and a molding assembly that covers and conceals the roof ditch in accordance with one embodiment.
Figure 2:
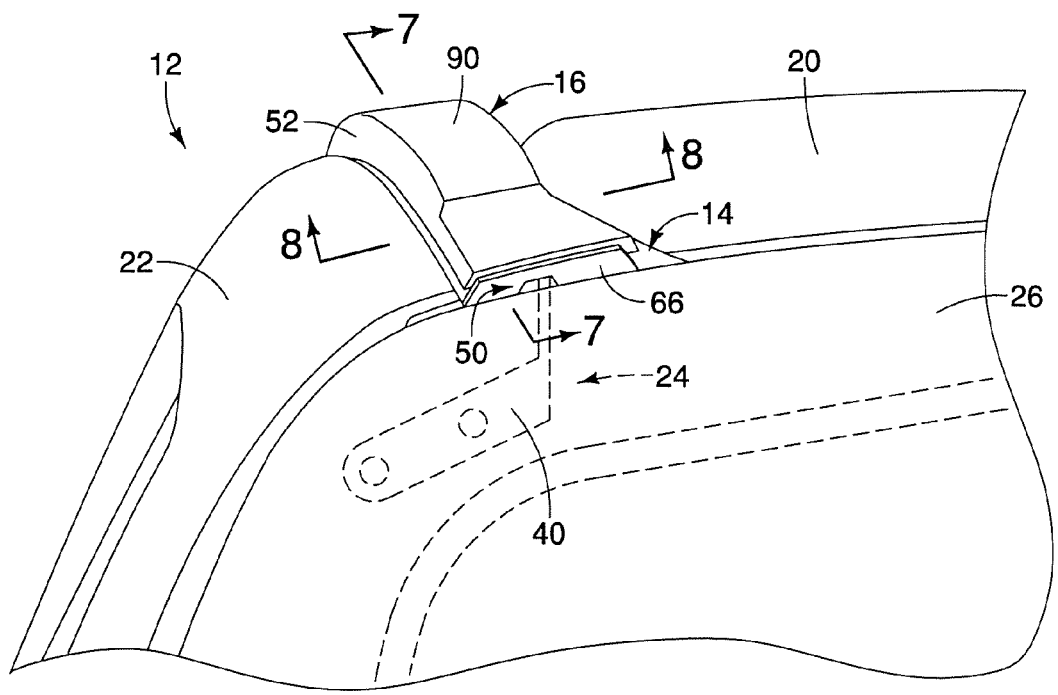
FIG. 2 is a rear plan view of the vehicle body structure showing a portion of the molding assembly and the roof ditch in accordance with the one embodiment.

Referring initially to FIGS. 1 and 2, a vehicle 10 is illustrated in accordance with a first embodiment. The vehicle 10 includes a vehicle body structure 12 that defines a pair of roof ditches 14 that are covered and concealed by corresponding molding assemblies 16. The molding assemblies 16 are described in greater detail below after a description of selected portions of the vehicle body structure 12 and the roof ditches 14.

As shown in FIGS. 1-3 and 6-10, the vehicle body structure 12 includes, among other things, a roof panel 20, a pair of side panels 22, a pair of hinges 24, a vehicle door 26 and the molding assemblies 16. The roof panel 20 and the side panels 22 are typically formed of one or more pieces of sheet metal or any other suitable material that is welded or rigidly and fixedly attached together to form a substantially rigid portion of the vehicle body structure 12. Also the roof panel 20 and/or the side panels 22 can be supported by other structural members as needed and/or desired.

The roof panel 20 and the side panels 22 are dimensioned, contoured and shaped to define the pair of roof ditches 14 that are spaced apart along the roof panel 20 in a direction that is perpendicular or substantially perpendicular to a longitudinal direction or lengthwise direction of the roof ditches 14. As indicated, the side panels 22 are fixed to the roof panel 20 such that the side panels 22 and the roof panel 20 collectively define the overall shape of the roof ditches 14. Each roof ditch 20 is thus a joint that is made by union of the roof panel 20 and a respective one of the side panels 22 of the vehicle 10. The roof ditches 14 are contoured and shaped to compliment the overall shape and design of the vehicle 10. The depicted contour and overall shape of the roof ditches 14 can vary from vehicle to vehicle. Further the roof ditches 14 are depicted as extending between front and rear ends of the roof panel 20 and side panels 22. Other orientations and directional orientation are possible and are within the scope of the invention.

The roof ditches 14, the hinges 24 and the molding assemblies 16 are identical to one another except that they are symmetrically shaped mirror images of one another. Consequently, description of one roof ditch 14, one hinge 24 and one molding assembly 16 applies to both. Therefore, for the sake of brevity, only one of the roof ditches 14, only one of the hinges 24 and only one of the molding assemblies 16, are described below.

Figure 4:
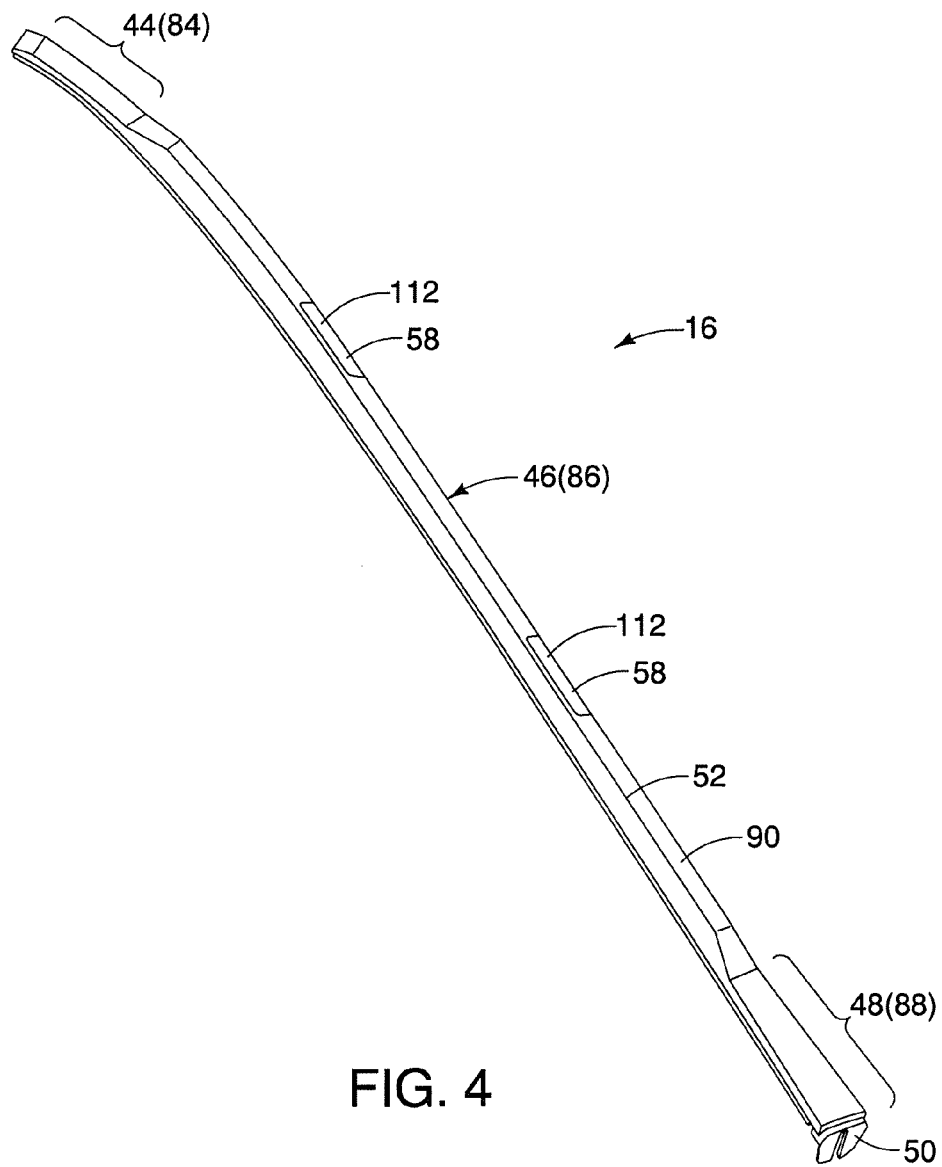
FIG. 4 is a perspective view of the molding assembly shown removed from the vehicle in accordance with the one embodiment.
Figure 5:
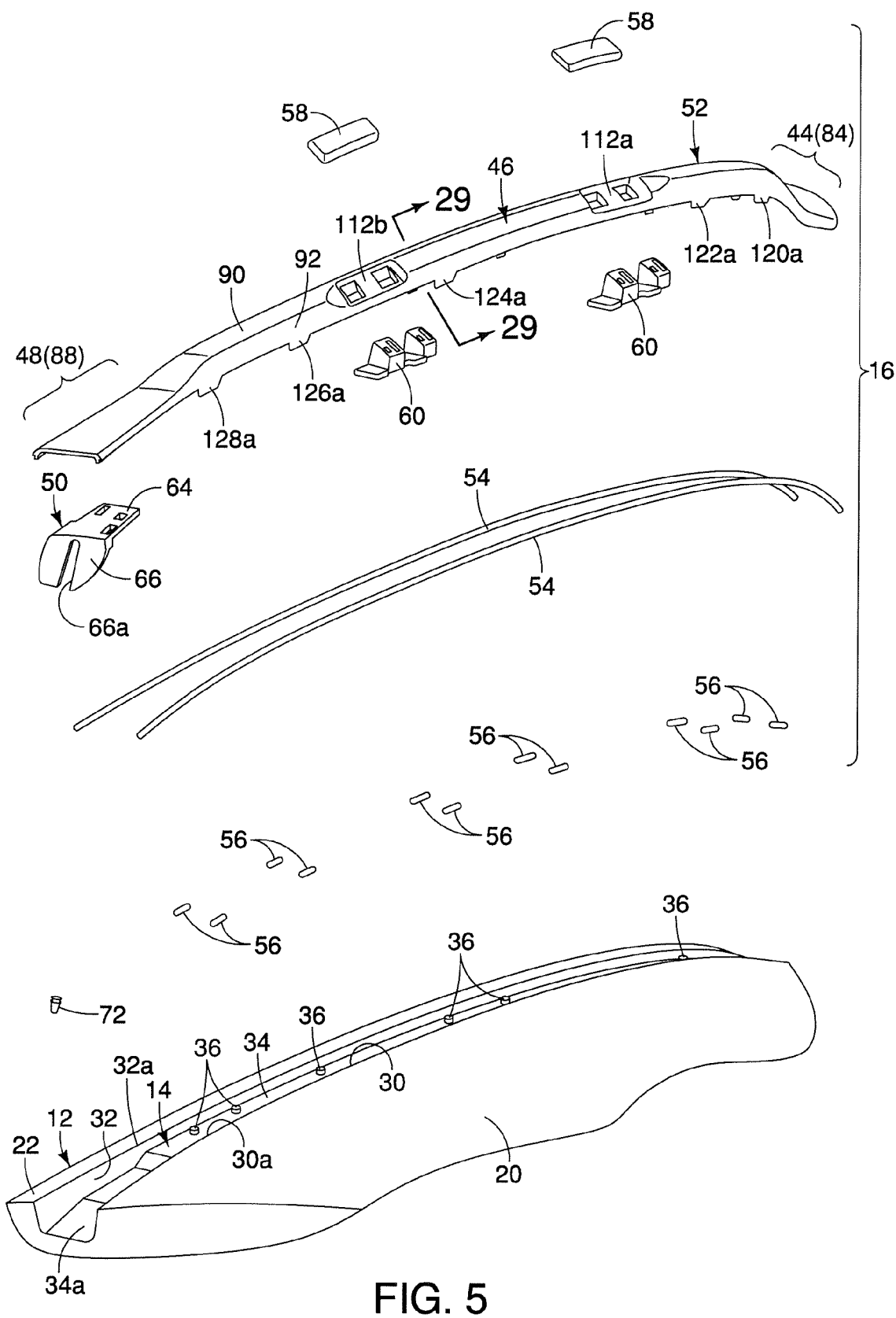
FIG. 5 is an exploded perspective view of the molding assembly and the roof ditch showing a molding member, a cover, seals and cushions of the molding assembly in accordance with the one embodiment.

As indicated in FIG. 5, the roof ditch 14 and the molding assembly 16 both include a compound arcuate and curved shape. Specifically, as indicated in the side view in FIG. 3, the molding assembly 16 and the roof ditch 14 beneath the molding assembly 16, have an arcuate shape when viewed from the side. When viewed from above, as in FIGS. 1 and 5, the roof ditch 14 has a curved shape. The overall curved and contoured shape of the molding assembly 16 is demonstrated in FIG. 4 and corresponds to the shape of the roof ditch 14. Specifically, FIG. 4 shows the molding assembly 16 removed from the roof ditch 14, but is shown with an overall shape that corresponds to the overall shape of the roof ditch 14.

Also, as shown in FIGS. 5, 8, 9 and 10, the roof ditch 14 includes an inner wall surface 30 that is within a lateral boundary of the roof panel 20, an outer wall surface 32 that is positioned adjacent to the lateral boundary of the roof panel 20 and a recessed support surface 34 that extends laterally between the bottom edges of the inner and outer wall surfaces 30 and 32. The inner wall surface 30 extends longitudinally along a first side of the recessed support surface 34 and the outer wall surface 32 extends longitudinally along a second side of the recessed support surface 34. The outer wall surface 32 is disposed outboard of the inner wall surface 30. The inner wall surface 30 terminates at a top edge 30a that is defined along the intersection of the inner wall surface 30 and the roof panel 20. Similarly, the outer wall surface 32 terminates at top edge 32a that is defined along the intersection of the outer wall surface 32 and the adjacent one of the side panels 22. The inner wall surface 30, the outer wall surface 32 and the recessed support surface 34 therefore extend from the front section of the roof of the vehicle body structure 12 to the rear section of the roof of the vehicle body structure 12.

Figure 33:
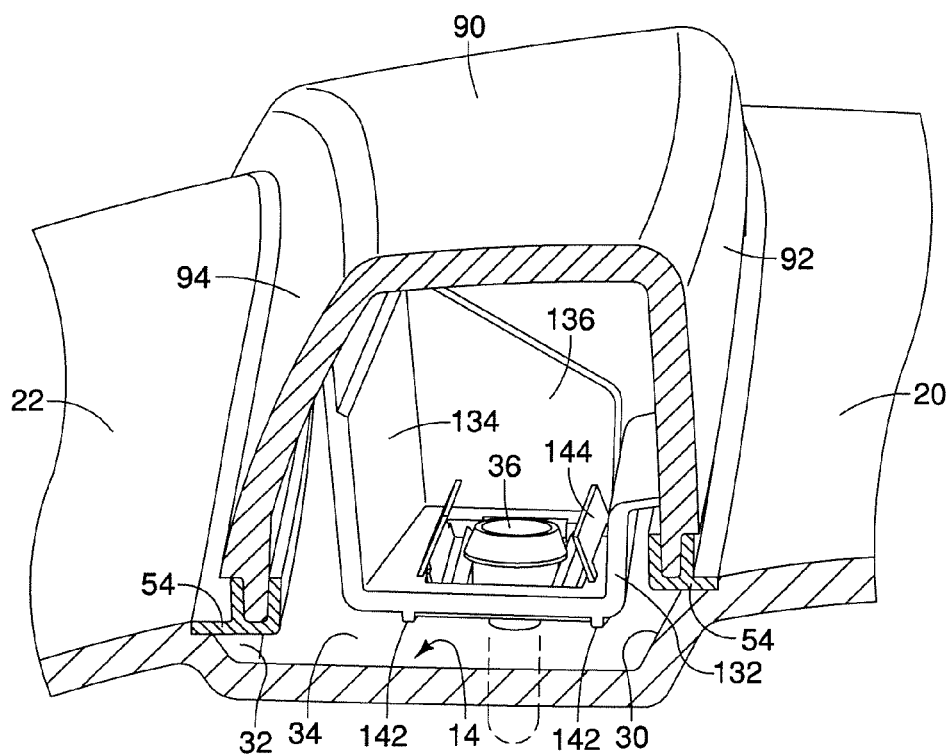
FIG. 33 is a cross-sectional view of the mid-section of the molding member and the roof ditch taken along the line 33-33 in FIG. 1 in accordance with the one embodiment.
Figure 34:
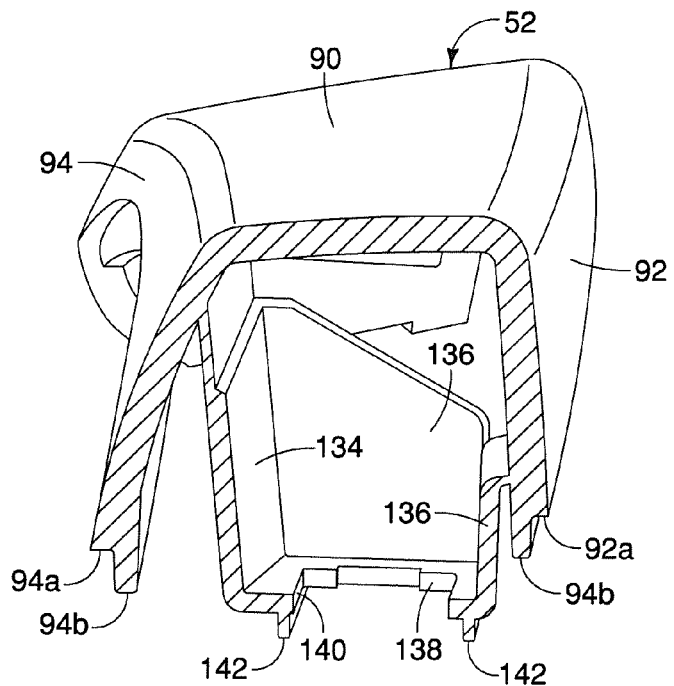
FIG. 34 is a cross-sectional view of the mid-section of the molding member taken along the line 34-34 in FIG. 21 in accordance with the one embodiment.
Figure 35:
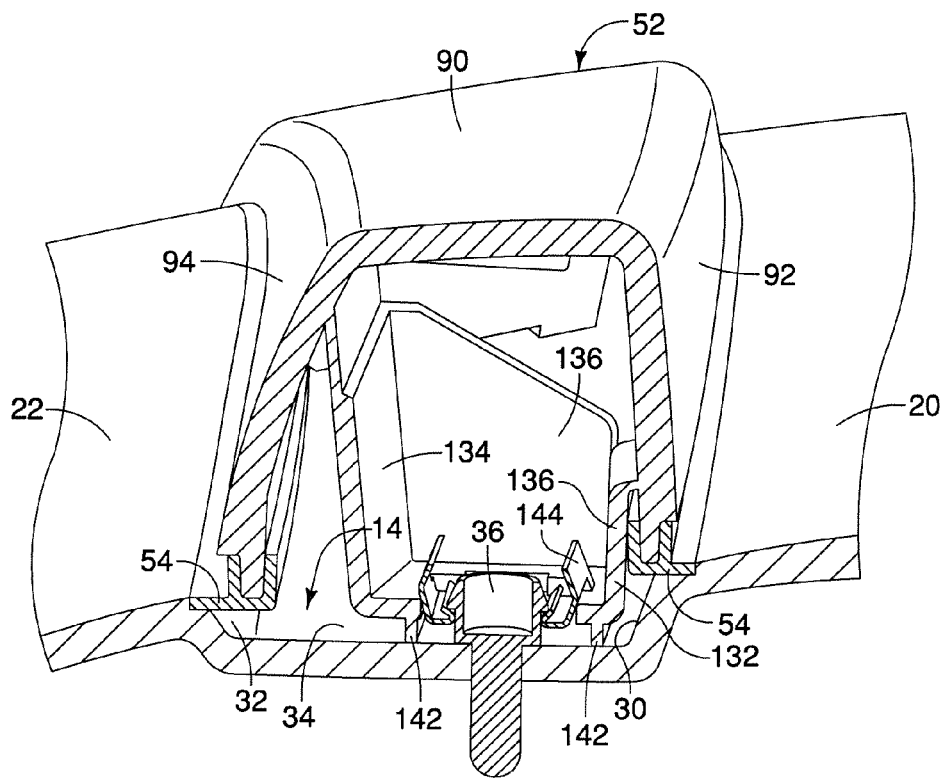
FIG. 35 is a cross-sectional view of the mid-section of the molding member and the roof ditch taken adjacent to the line 33-33 in FIG. 1 in accordance with the one embodiment.

As shown in FIG. 5, a rearward section 34a of the recessed support surface 34 has a depth that is greater than the remainder of the recessed support surface 34 to accommodate the hinge 24. As is shown in FIG. 5, the roof ditch 14 includes a plurality of fastening members 36. Specifically, each of the fastening members 36 includes a head portion and a shaft portion. As indicated in FIGS. 33 and 35, the shaft portion of each fastening members 36 is rigidly fixed to and extends through the recessed support surface 34 of the roof ditch 14. The head portion of each of the fastening members 36 extends above the recessed support surface 34. However the head portion of each of the fastening members 36 is located below the top edges 30a and 32a of the inner and outer wall surfaces 30 and 32. The head portion of the fastening members 36 is dimensioned and shaped to provide an attachment point for the molding assembly 16, as is described in greater detail below.

Figure 6:
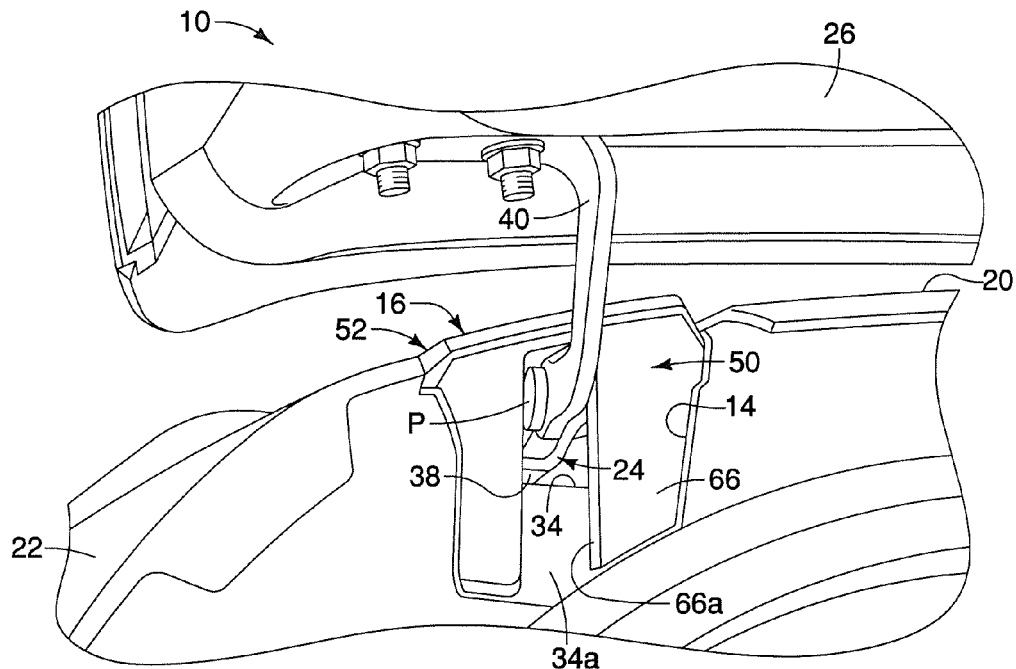
FIG. 6 is a perspective view of a rear portion of the vehicle body structure with a rear door of the vehicle in an open position revealing the cover of the molding assembly and a rear section of the roof ditch in accordance with the one embodiment.
Figure 7:
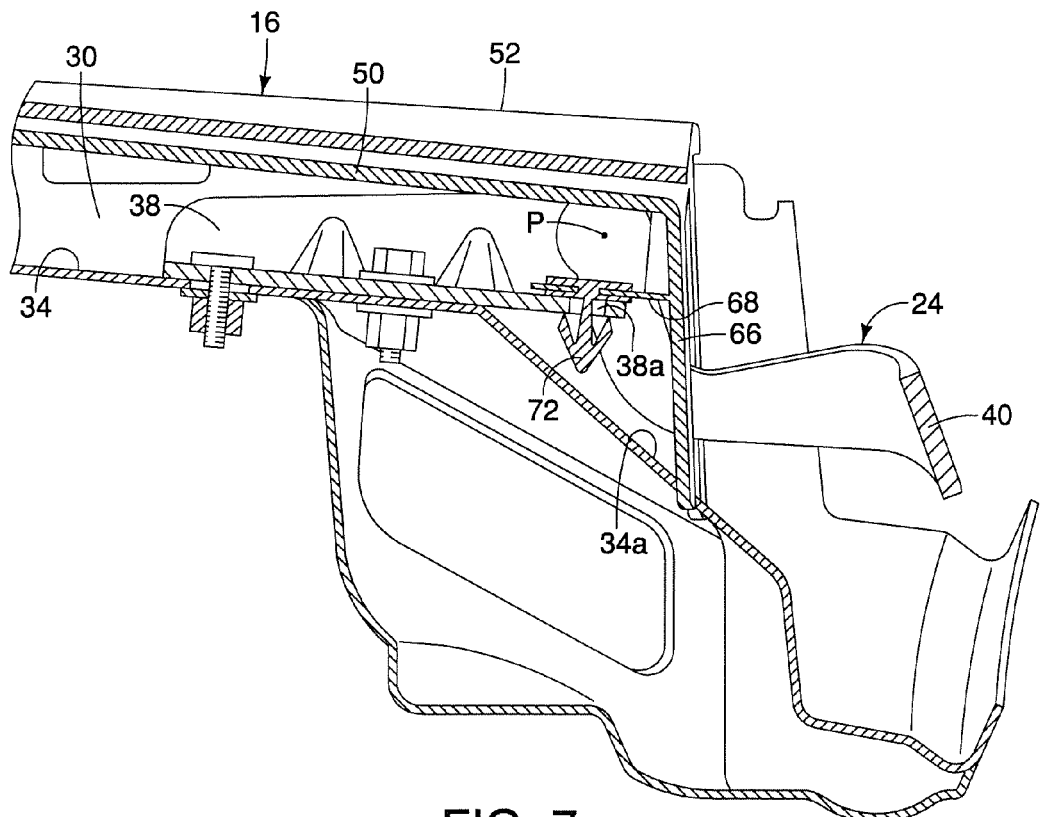
FIG. 7 is a side cross-sectional view of the rear end section of the roof ditch and the molding assembly taken along the line 7-7 in FIG. 2 in accordance with the one embodiment.
Figure 8:
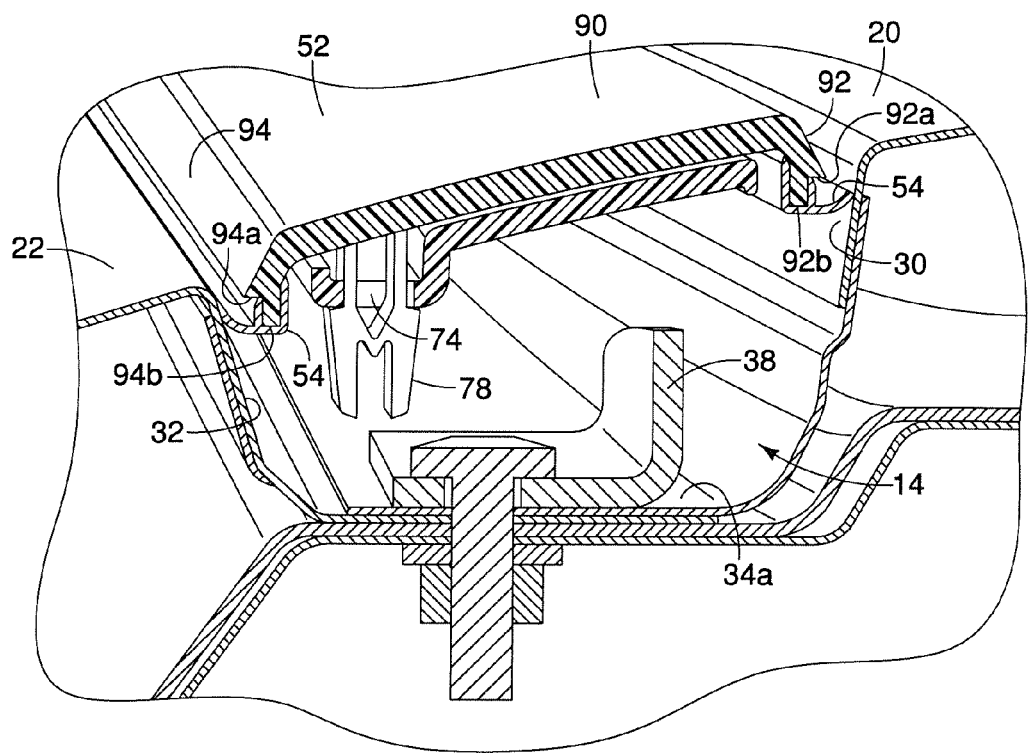
FIG. 8 is a cross-sectional view of the rear end section of the roof ditch and the molding assembly taken along the line 8-8 in FIG. 2 in accordance with the one embodiment.
Figure 9:
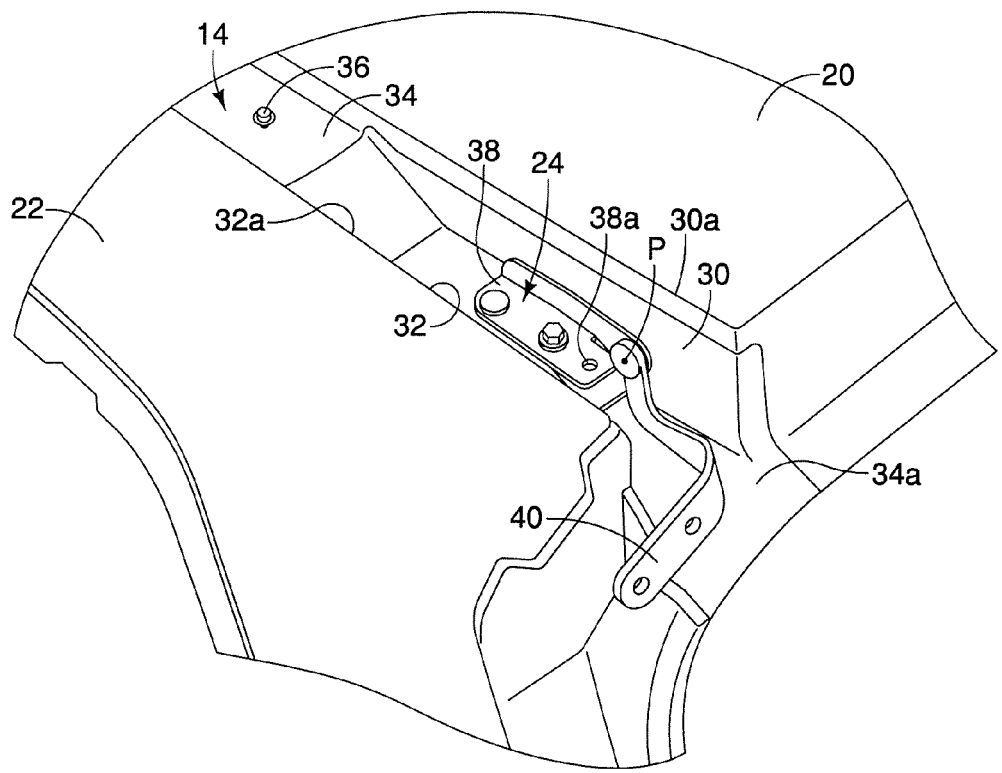
FIG. 9 is a perspective view of a rear portion of the vehicle body structure with the rear door and the molding assembly removed to reveal the roof ditch and a hinge installed to the roof ditch in accordance with the one embodiment.
Figure 10:
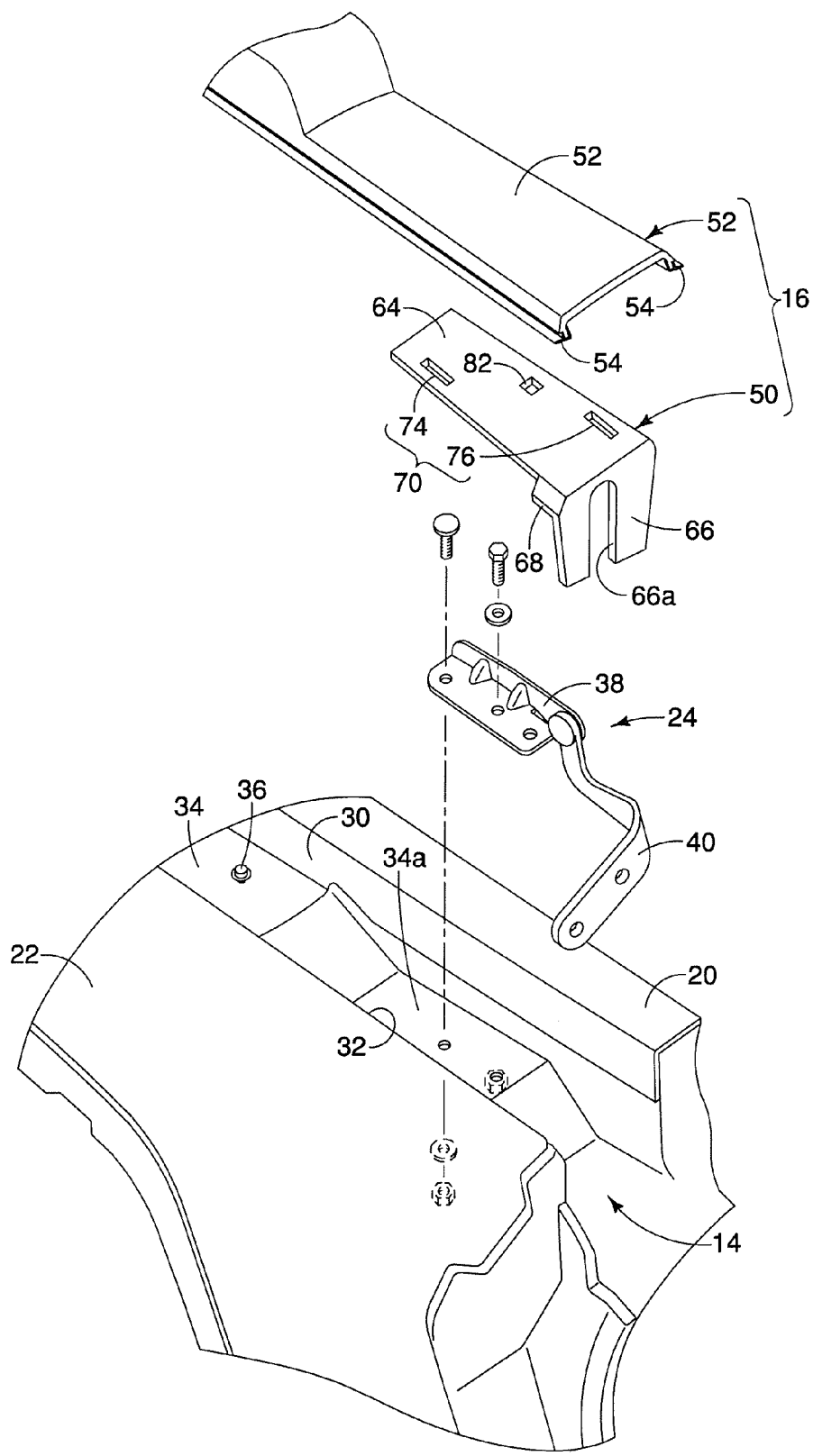
FIG. 10 is an exploded perspective view of the rear portion of the vehicle body structure similar to FIG. 9, showing features of the hinge, the cover and the molding member of the molding assembly in accordance with the one embodiment.

A brief description of the hinges 24 is now provided with specific reference to FIGS. 6-10. The hinge 24 at least partially extends into the roof ditch 14. Further, the hinge 24 is mounted in the roof ditch 14 of the roof panel 20 and is at least partially covered by sections of the molding assembly 30, as discussed in more detail below. Basically, the hinge 24 includes a base component 38 and an arm component 40. As shown in FIGS. 7, 9 and 10, the base component 38 of the hinge 24 is rigidly fixed to the rearward section 34a of the recessed support surface 34 of the roof ditch 14 by fasteners. As shown in FIG. 6, a rearward end of the base portion 38 is exposed at the pivot axis P. The arm component 40 pivots about the pivot axis P such that the majority of the arm component 40 of the hinge 24 is located outside of the roof ditch 14, as shown in FIG. 7. The arm component 40 is rigidly fixed to an upper end of the vehicle door 26 by fasteners (not shown).

The pivot axes P of the hinges 24 are generally perpendicularly arranged with respect to a longitudinal direction of the vehicle body structure 12. In other words, the vehicle door 26 is configured as a lift gate with the hinges 24 having the horizontally arranged pivot axes P between the base component 38 and the arm component 40.

Thus, in the illustrated embodiment, the vehicle door 26 is configured as a rear door (i.e., a lift gate) of the vehicle 10. In other words, the vehicle door 26 is configured as a lift gate with the hinges 24 having horizontally arranged pivot axes P between the roof panel 20 and the vehicle door 26. Typically, the pivot axes P extend in directions that are perpendicular or at least transverse to the longitudinal direction of the vehicle 10. As shown in FIGS. 1 and 2, the hinges 24 are situated at an upper-rear portion of the vehicle door 26 of the vehicle body structure 12.

The vehicle door 26 that is typically formed of metal or any other suitable material and is pivotally mounted to the vehicle body structure 12 by the pair of hinges 24. The hinges 24 are typically made of metal or any other suitable rigid material having sufficient strength and durability to support the vehicle door 26 in the open position. A more detailed description of the hinge 24 and vehicle door 26 can be found in U.S. application Ser. No. 13/042,990, filed Mar. 8, 2012. The disclosure of U.S. application Ser. No. 13/042,990 is incorporated herein by reference in its entirety.

Figure 3:
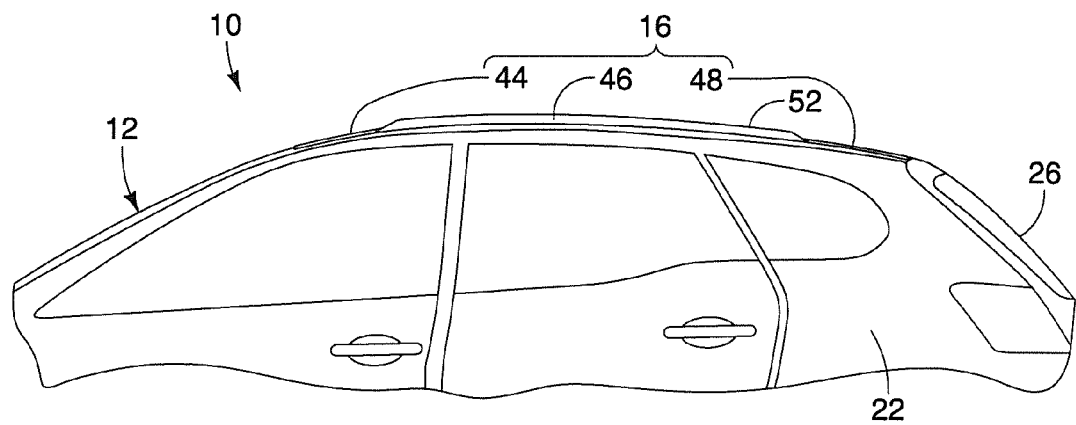
FIG. 3 is a side view of the vehicle body structure showing the molding assembly installed to the roof ditch with a section of the molding assembly extending above the roof line of the vehicle body structure in accordance with the one embodiment.

A description of the molding assembly 16 is now provided with initial reference to FIGS. 3, 4 and 5. The molding assembly 16 can be made of plastic or any other suitable material that can have some flexibility. In the depicted embodiment, the molding assembly 16 is contoured and shaped to extend partially into and covers the roof ditch 14.

As indicated in FIG. 3, the molding assembly 16 includes a front section 44, a mid-section 46 and a rear section 48. The front section 44 and the rear section 48 cover the roof ditch 14 and further are contoured to extend flush with the roof panel 20 (a vehicle body panel) between respective the top edges 30a and 32a of the first and second wall surfaces 30 and 32.

The mid-section 46 extends between the front and rear sections 44 and 48. The mid-section 46 has a convex contour as viewed in cross-section in FIGS. 30-35 and extends above the roof panel 20 (the vehicle body panel) between respective top edges 30a and 32a of the first and second wall surfaces 30 and 32 forming a roof rail protruding upward from and above the roof panel 20. Thus, the mid-section 46 has the appearance of a side roof rail, but does not include slots or gaps typically associated with roof rails or roof rack assemblies.

As shown in FIG. 5, the molding assembly 16 includes a plurality of components. Specifically, the molding assembly 16 basically includes a cover 50, an elongated molding member or molding member 52, a pair of elongated sealing members 54, a plurality of cushions 56 and a pair of caps 58 that conceal a pair of cleats 60.

A description of the cover 50 is now provided with specific reference to FIGS. 6, 7 and 10-15. The cover 50 can be made of, for example, a plastic material, a polymer material, a metallic material or other materials suitable for use in an exterior automotive application. The cover 50 basically includes a top portion 64 and a close-out portion 66. The top portion 64 is dimensioned and shaped to span a width of the roof ditch 14 between respective top edges 30a and 32a of the first and second wall surfaces 30 and 32.

The close-out portion 66 is angularly offset from the top portion 64, extending downward relative to the top portion 64 when installed to the vehicle 10 and the roof ditch 14. Specifically, the close-out portion 66 extends from a peripheral end edge 64a of the top portion 64 towards the recessed support surface 34 of the roof ditch 14, as indicated in FIGS. 6 and 7. The close-out portion 66 also defines a slot 66a through which the arm component 40 of the hinge 24 extends. The close-out portion 66 extends laterally along a rear open section of the roof ditch 14 from the inner wall surface 30 to the outer wall surface 32, but within the roof ditch 14.

Figure 11:
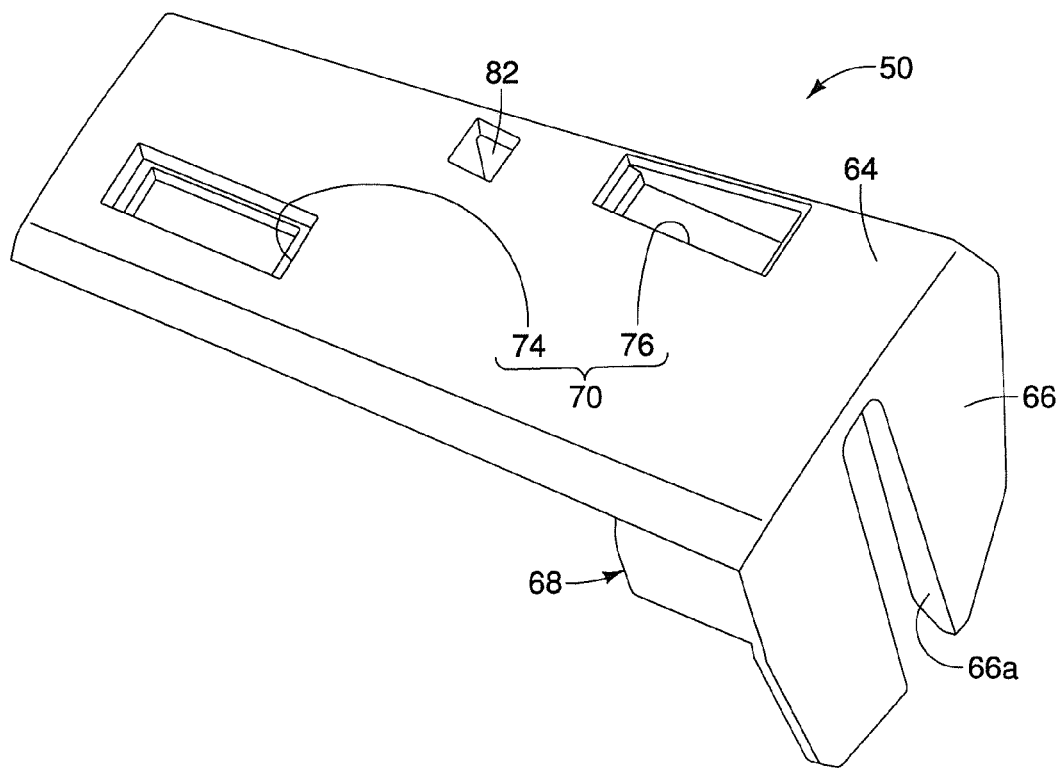
FIG. 11 is a perspective view of the cover of the molding assembly in accordance with the one embodiment.
Figure 12:
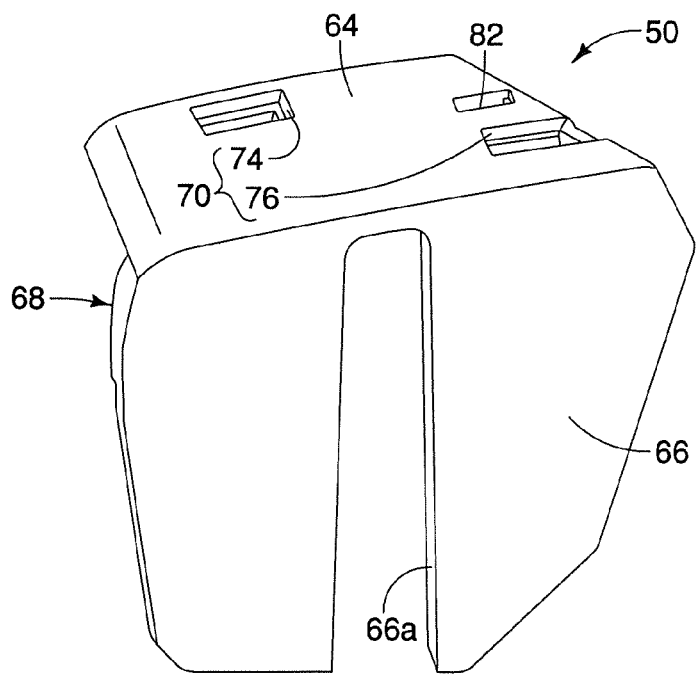
FIG. 12 is a rear plan view of the cover of the molding assembly in accordance with the one embodiment.
Figure 13:
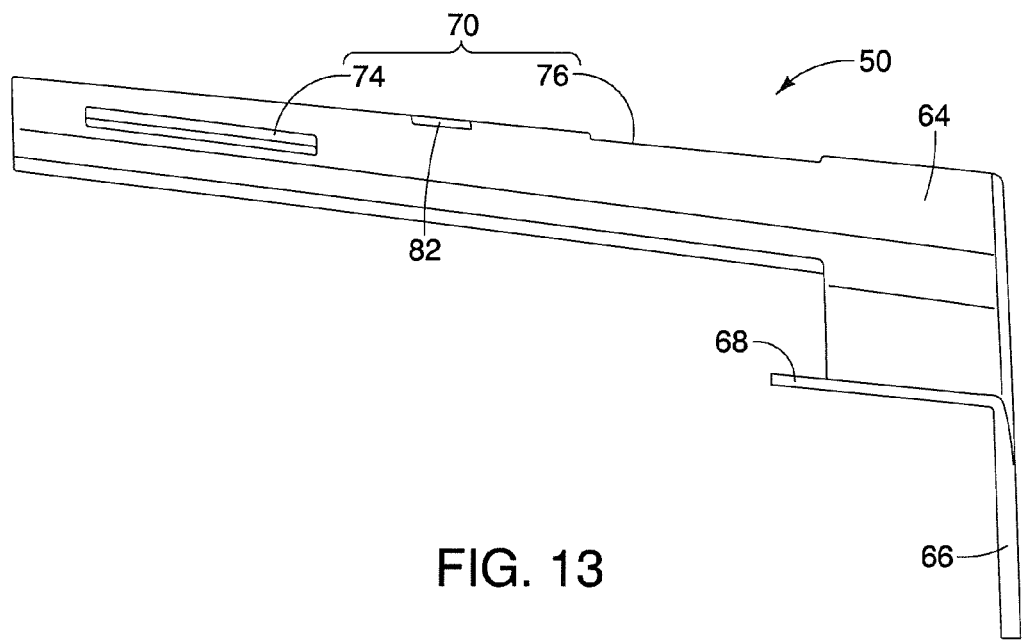
FIG. 13 is a side plan view of the cover of the molding assembly in accordance with the one embodiment.
Figure 14:
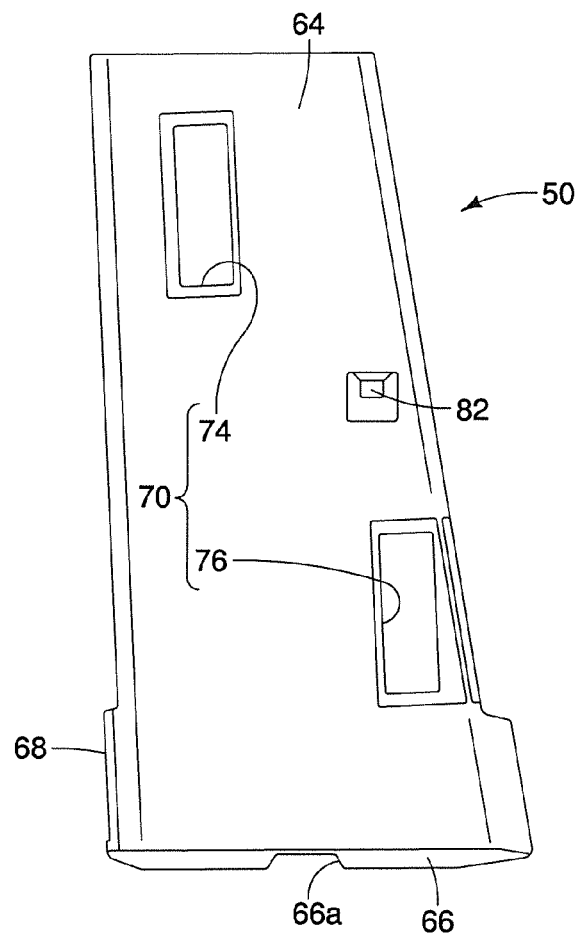
FIG. 14 is a top view of the cover of the molding assembly in accordance with the one embodiment.
Figure 15:
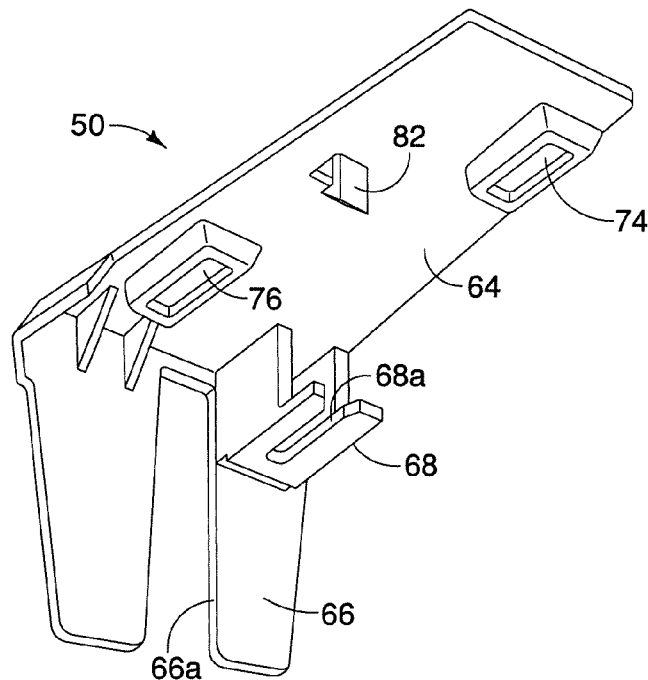
FIG. 15 is another perspective view of the cover of the molding assembly showing an underside of the cover in accordance with the one embodiment.

As indicated in FIGS. 11 and 15, the cover 50 also includes a cover attachment section 68 and a molding attachment section 70. The cover attachment section 68 is provided to couple the cover 50 at a fixed position relative to the vehicle body structure 12. Specifically, the cover attachment section 68 is configured to fix the cover 50 to the hinge 24, with the hinge 24 being fixedly secured to the roof ditch 14 by fasteners, as indicated in FIGS. 8, 9 and 10.

Figure 17:
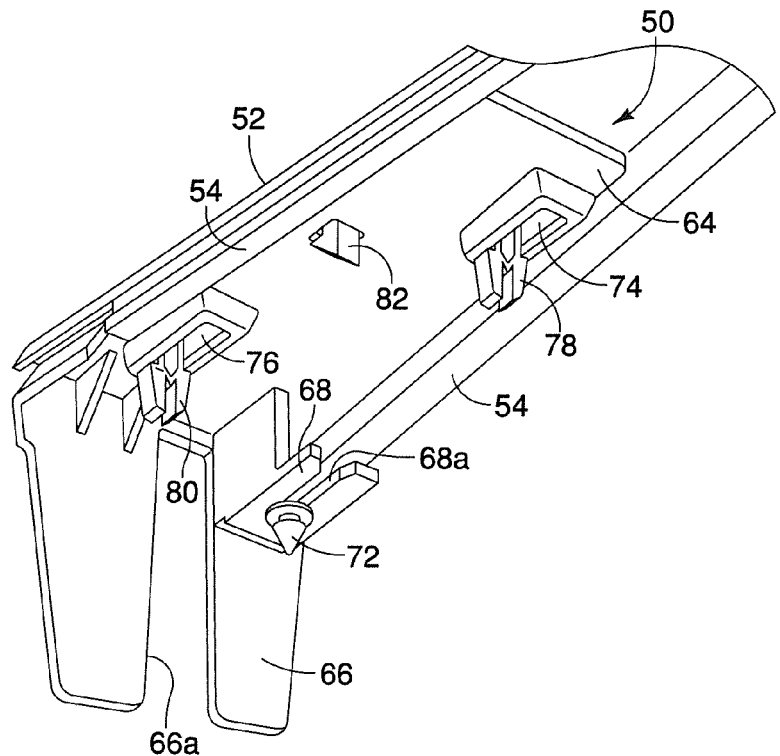
FIG. 17 is another perspective view of the underside of the cover of the molding assembly showing the rear section of the molding member installed to the cover in accordance with the one embodiment.

The cover attachment section 68 is defined by a box-like structure that extends from an underside of the top portion 64 along a concealed side of the close-out portion 66, as shown in FIG. 15. The cover attachment section 68 defines a fastener slot 68a. As shown in FIG. 17, a snap-fitting fastener 72 is installed in the fastener slot 68a. As shown in FIG. 7, the snap-fitting fastener 72 is inserted thru an aperture 38a in the base component 38 of the hinge 24, thereby fixing the cover 50 in position relative to the hinge 24 and the roof ditch 14.

Figure 16:
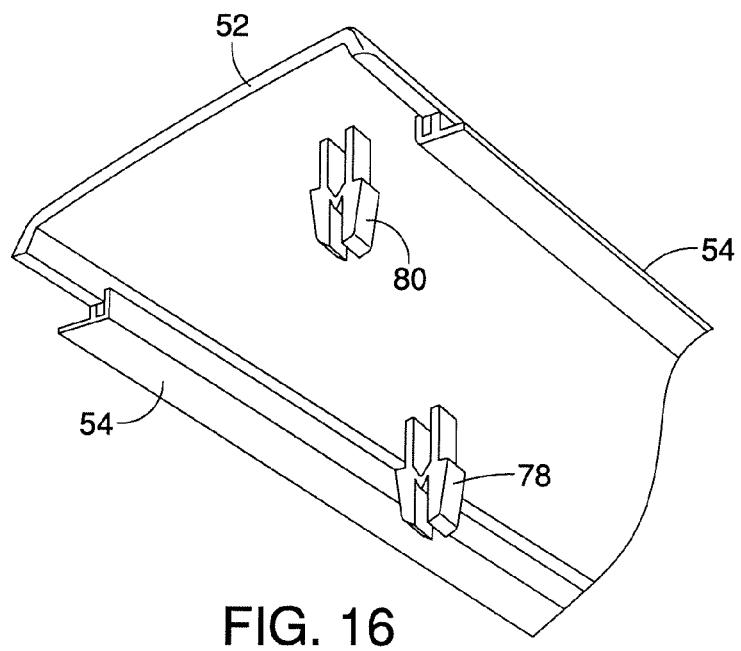
FIG. 16 is a perspective view of a rear section of the molding member of the molding assembly showing an underside of the rear section of the molding member in accordance with the one embodiment.
Figure 18:
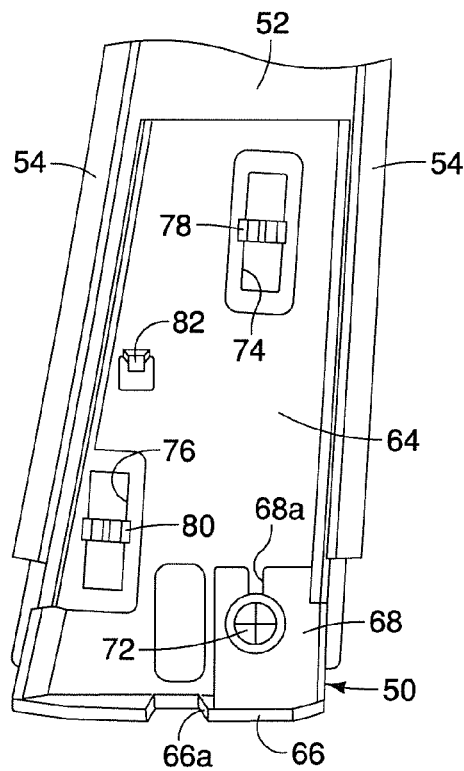
FIG. 18 is a bottom view of the cover of the molding assembly showing the rear section of the molding member installed to the cover in accordance with the one embodiment.
Figure 19:
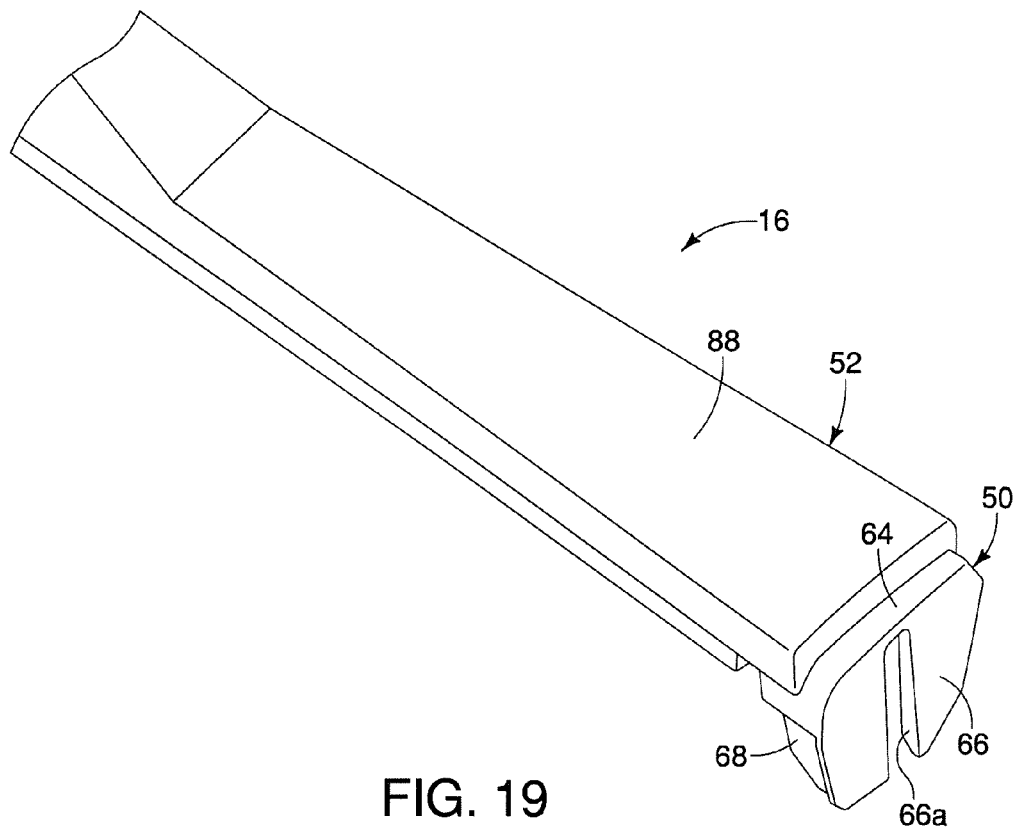
FIG. 19 is a perspective view of a rear section of the molding assembly showing the rear section of the molding member installed to the cover in accordance with the one embodiment.
Figure 20:
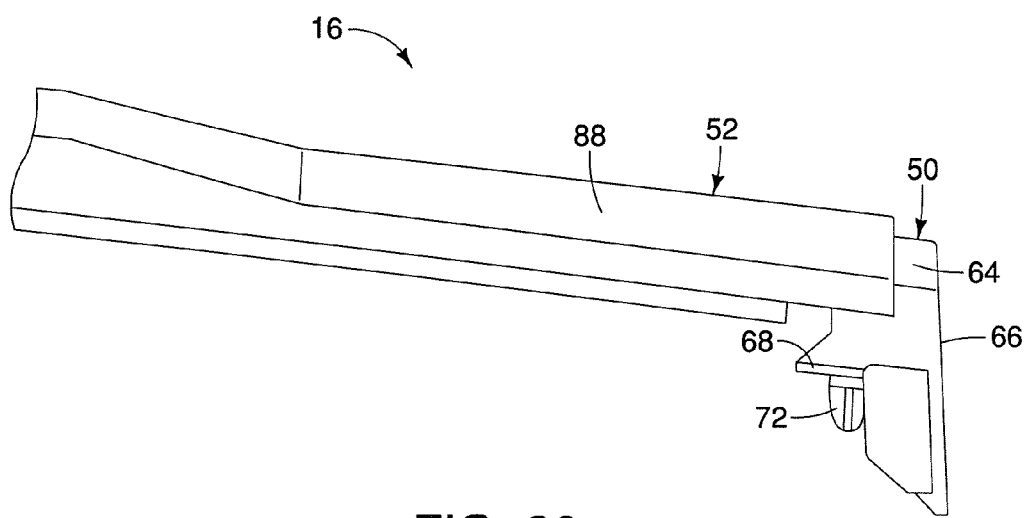
FIG. 20 is a side plan view of a rear section of the molding assembly showing the molding member installed to the cover in accordance with the one embodiment.

The molding attachment section 70 is defined along the top portion 64 of the cover 50, as shown in FIGS. 11-15. More specifically, the molding attachment section 70 includes first and second slots 74 and 76 which, along with snap fitting projections 78 and 80 of the molding member 52 (shown in FIGS. 16-18), define a lengthwise movement connection between the cover 50 and the molding member 52. The first slot 74 and the second slot 76 are defined by the top portion 64 of the cover 50. The first and second slots 74 and 76 are both laterally and longitudinally offset with respect to the lengthwise direction of the roof ditch 14.

The first slot 74 and the second slot 76 both extend in the lengthwise direction of the roof ditch 14. As is further explained below, the snap fitting projections 78 and 80 are attachment members of the molding member 52 and are movably installed, respectively, in the first and second slots 74 and 76. As a result of the lengthwise movement connection between the snap fitting projections 78 and 80 of the molding member 52 and the first slot 74 and the second slot 76 of the cover 50, the rear section 48 of the molding member 52 is movable relative to the cover 50 in the lengthwise direction of the roof ditch 14. The snap fitting projection 78 snap-fits into the first slot 74 of the cover 50 such that the molding member 50 cannot move in lateral directions relative to the cover 50. However, the snap fitting projection 78 can slide in a lengthwise direction of the roof ditch 14 along the first slot 74. Similarly, the snap fitting projection 80 snap-fits into the second slot 76 of the cover 50 such that the molding member 50 cannot move in lateral directions relative to the cover 50. However, the snap fitting projection 80 can slide in a lengthwise direction of the roof ditch 14 along the second slot 76.

The possible movement of the molding member 52 in the lengthwise direction of the roof ditch 14 is provided because the molding assembly 16 is made of a completely different material than the roof panel 20 and the side panel 22. Specifically, the vehicle body structure 12 is preferably made of metal. The molding assembly 16 can be made of plastic, polymers, rubber material or the like. Consequently, the molding member 52 can undergo expansion and contraction in response to changes in temperature that differs from the thermal expansion and contraction rates of the vehicle body structure 12. Specifically, the overall length of the molding member 52 can increase and decrease as a result of thermal expansion and contraction relative to the vehicle 10. The first and second slots 74 and 76 are elongated such that the snap fitting projections 78 and 80 can undergo limited sliding movement along the length of the first and second slots 74 and 76 to accommodate the changes in overall length of the molding member 52 as it undergoes thermal expansion and contraction.

As is indicated in FIGS. 6 and 7, the cover 50 and the roof ditch 14 define a cavity. The base component 38 of the hinge 24 is situated within this cavity and the arm component 40 (a vehicle door mounting structure) of the hinge 24 is situated outside of the cavity. More specifically, a rear end of the base component 38 of the hinge 24 is located adjacent to the slot 66a of the close-out portion 66 of the cover 50. The arm component 40 of the hinge 24 extends through the slot 66a of the close-out portion 66 of the cover 50. Consequently, the majority of the arm component 40 of the hinge 24 is substantially located outside of the cavity defined by the cover 50 and the roof ditch 14.

The cover 50 also includes a hook 82 that extends downward from the top portion 64 of the cover 50. The hook 82 is configured to hook on to a forward edge of the base component 38 of the hinge 24 to further secure the cover 50 in place relative to the roof ditch 14.

A description of the molding member 52 is now provided with specific reference to FIGS. 21-35. The molding member 52 is an elongated member that is formed unitarily as a single monolithic element. The molding member 52 can be molded in a single step, or can be molded in a series of steps to form the single monolithic element. The molding member 52 can be made of a plastic material, a polymer material, a rubber or rubber-like material or any other material suitable for use as a molding in an automotive application where such molding is exposed to the elements (sunshine, wind, cold, heat, rain, etc . . . ).

The molding member 52 includes three basic sections, a front section 84, a mid-section 86 and a rear section 88. The front section 84 corresponds to the front section 44 of the molding assembly 16, the mid-section 86 corresponds to the mid-section 46 of the molding assembly and the rear section 88 corresponds to the rear section 48 of the molding assembly 16. Specifically, the front section 84 and the rear section 88 cover the roof ditch 14 and further are contoured to extend flush with the roof panel 20 between respective the top edges 30a and 32a of the first and second wall surfaces 30 and 32. The mid-section 86 extends between the front and rear sections 84 and 88. The mid-section 86 has a convex contour (as viewed in cross-section in FIGS. 30-3) and extends above the roof panel 20 between respective top edges 30a and 32a of the first and second wall surfaces 30 and 32 forming a roof rail protruding upward from and above the roof panel 20. Thus, the mid-section 86 has the appearance of a side roof rail, but does not include slots or gaps typically associated with roof rails or roof rack assemblies. The front section 84, the mid-section 86 and the rear section 88 extend in a lengthwise direction relative to the roof ditch 14.

When viewed in cross-section as in FIGS. 30-35, the molding member 52 includes a top portion 90, a first lateral side 92, a second lateral side 94, a plurality of attachment structures 96, 98, 100, 102, 104, 106, 108 and 110 and the above described snap fitting projections 78 and 80.

The top portion 90 has a contoured shape that has differing profiles along the lengthwise direction. For example, as indicated in FIGS. 1-3, 5, 8 and 10 in the front section 84 and rear section 88 of the molding member 52, the top portion 90 appears to be flat, but can be contoured to include a slight curvature and arcuate profile corresponding to the curvature and arcuate contour of the roof panel 20 and adjacent side panel 22. In the mid-section 86 of the molding member 52, the top portion 90 is raised, such that the top portion 90 protrudes above the roof panel 20 and adjacent side panel 22. Further, within the mid-section 86 of the molding member 52, the overall shape and cross-sectional profile of the top portion 90 changes along the lengthwise direction, as indicated in the drawings. The top portion 90 can be shaped and contoured in any of a variety of shapes depending upon the overall design of the vehicle body structure 12 of the vehicle 10. The shape of the top portion 90 in the depicted embodiment is for example only, and is not intended to limit the overall shape and appearance of the top portion 90.

Figure 21:
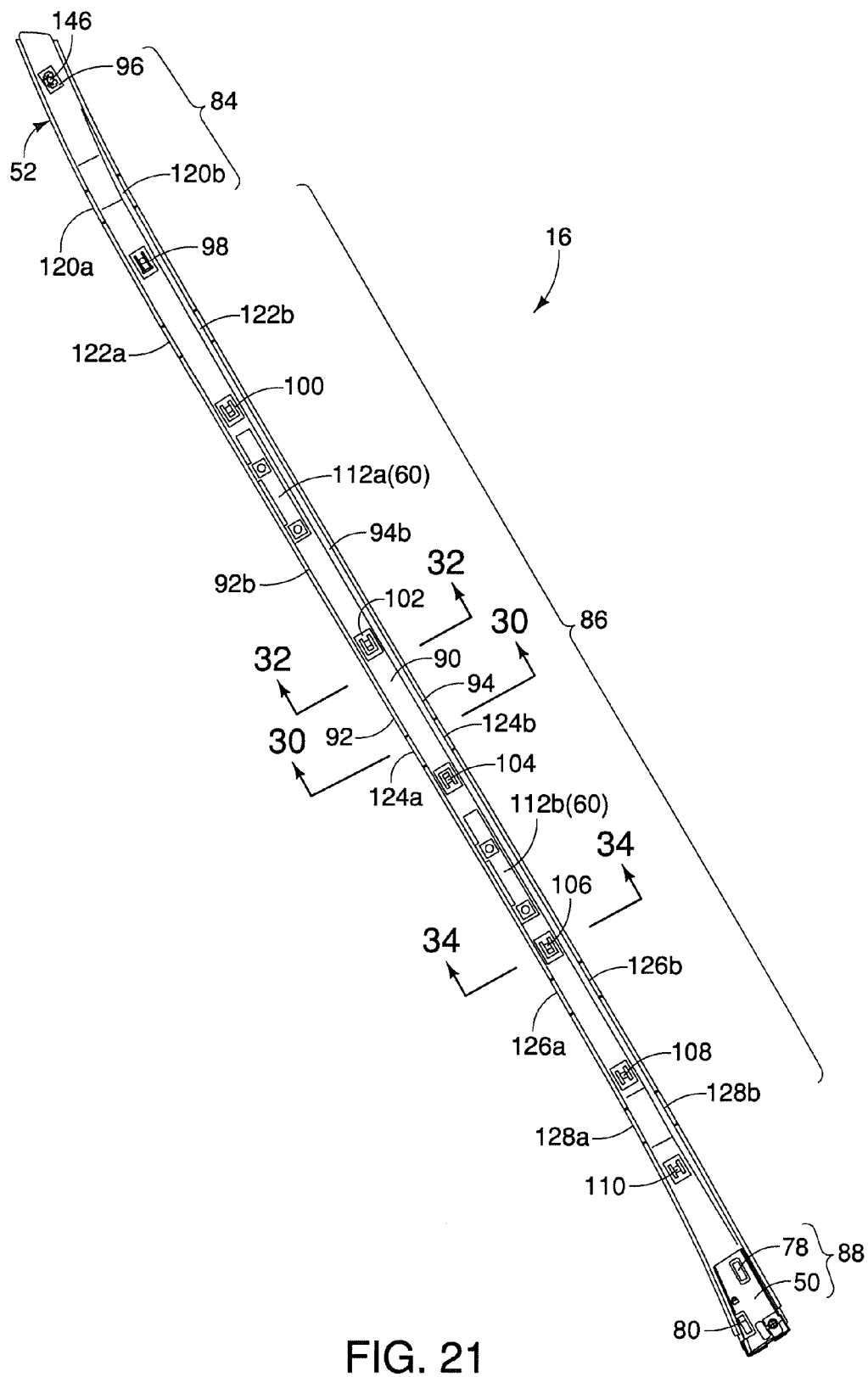
FIG. 21 is a bottom view of the molding assembly showing the underside of the cover and the molding member removed from the vehicle body structure in accordance with the one embodiment.

As shown in FIGS. 4, 5 and 21, the top portion 90 includes a pair of openings 112a and 112b. The openings 112a and 112b are covered by the caps 58. The caps 58 are removable to expose the cleats 60. The cleats 60 are fixed to the recessed support surface 34 by fasteners (not shown). The cleats 60 are configured to support cross-members (not shown) that form part of an optional feature of a roof rack system. These cross-members extend across the roof panel 20 between the two roof ditches 14 and are attached to the cleats 60 in a conventional manner. It should be understood from the drawings and description herein that the openings 112a and 112b, the cleats 60 and the caps 58 are optional features that can be omitted. Since these features are optional, further description is omitted for the sake of brevity.

Figure 31:
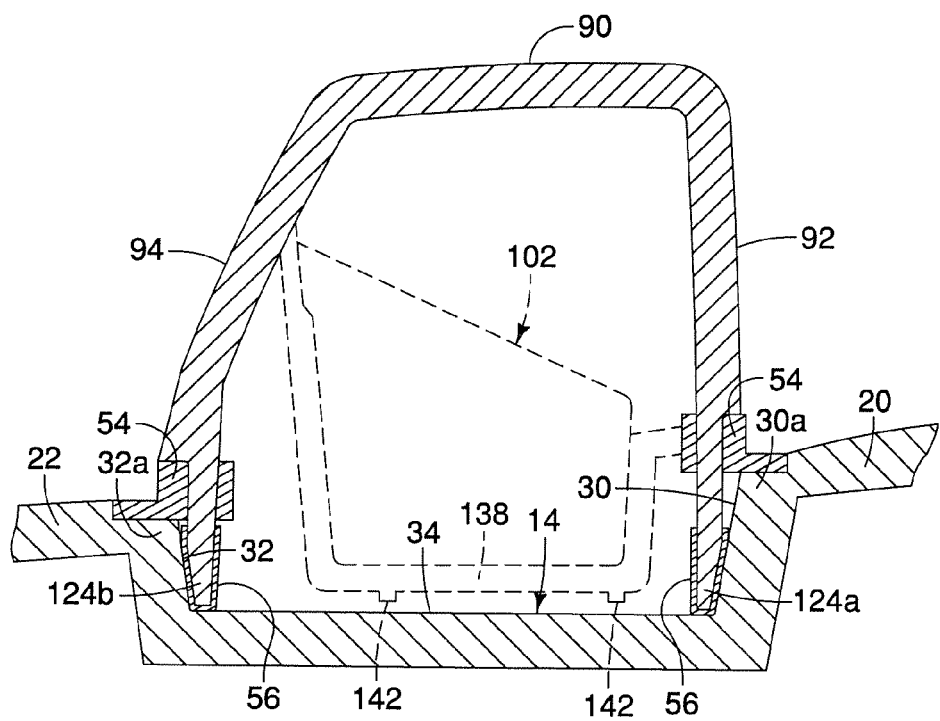
FIG. 31 is a simplified cross-sectional view of the mid-section of the molding member and the roof ditch taken along the line 31-31 in FIG. 1 in accordance with the one embodiment.
Figure 32:
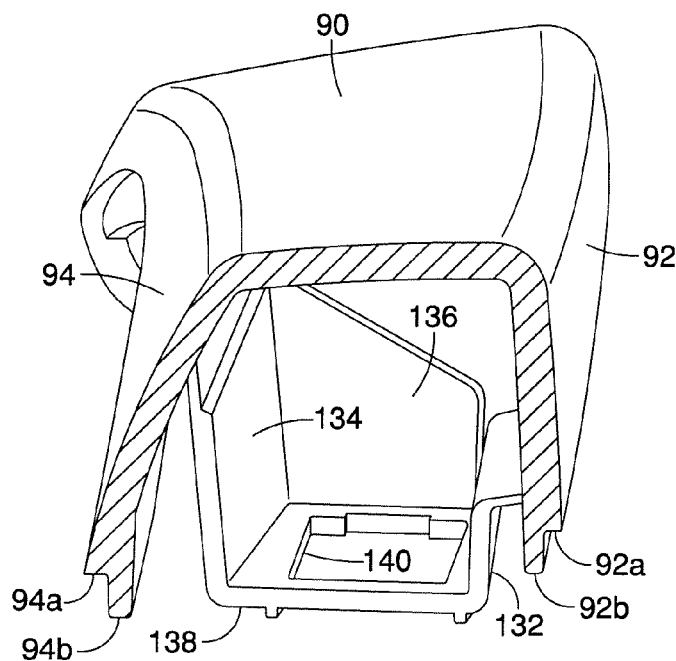
FIG. 32 is a cross-sectional view of the mid-section of the molding member taken along the line 32-32 in FIG. 21 in accordance with the one embodiment.

The first lateral side 92 and second lateral side 94 extend downward from opposite lateral sides of the top portion 90 of the molding member 52. The first lateral side 92 is positioned adjacent to the roof panel 20 and the second lateral side 94 is positioned adjacent to the side panel 22 with the molding member 52 installed to the roof ditch 14. The first and second lateral sides 92 and 94 further include respective recesses or lips 92a and 94a that extend in a lengthwise direction along the entire length of the molding member 52. With the molding member 52 installed to the roof ditch 14, the lip 92a is positioned adjacent to the top edge 30a of the inner wall surface 30, and the lip 94a is positioned adjacent to the top edge 32a of the outer wall surface 32, as indicated in FIGS. 31 and 33. The first lateral side 92 includes a bottom edge 92b that is located below the lip 92a, as shown in FIG. 32. As well, the second lateral side 94 includes a bottom edge 94b that is located below the lip 92a, as shown in FIG. 32.

Figure 22:
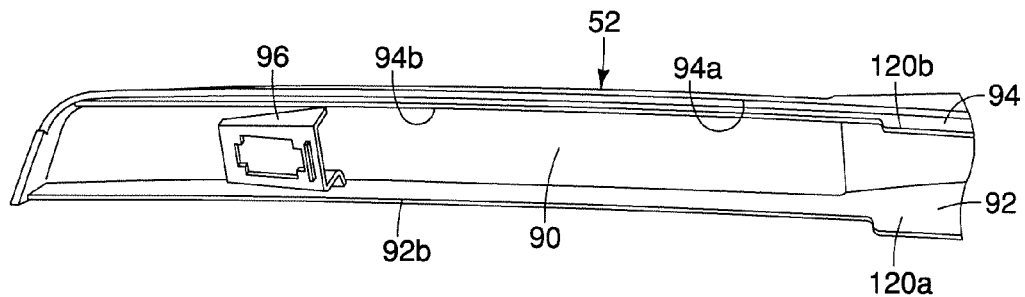
FIG. 22 is a perspective view of a front section of the molding member showing an attachment structure that extends down from an underside of the molding member in accordance with the one embodiment.
Figure 23:
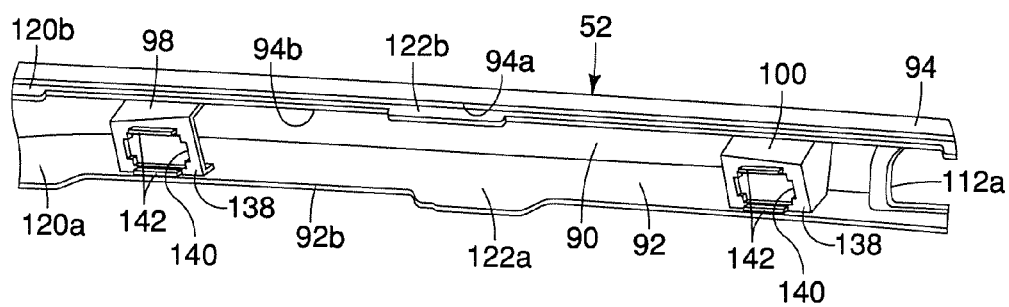
FIG. 23 is a perspective view of a first portion of a mid-section of the molding member showing two attachment structures that extend down from the underside of the molding member in accordance with the one embodiment.
Figure 24:
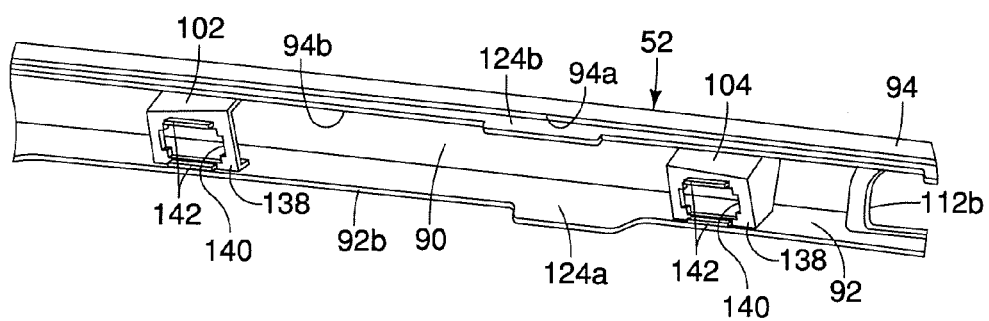
FIG. 24 is a perspective view of a second portion of the mid-section of the molding member showing two further attachment structures that extend down from the underside of the molding member in accordance with the one embodiment.
Figure 25:
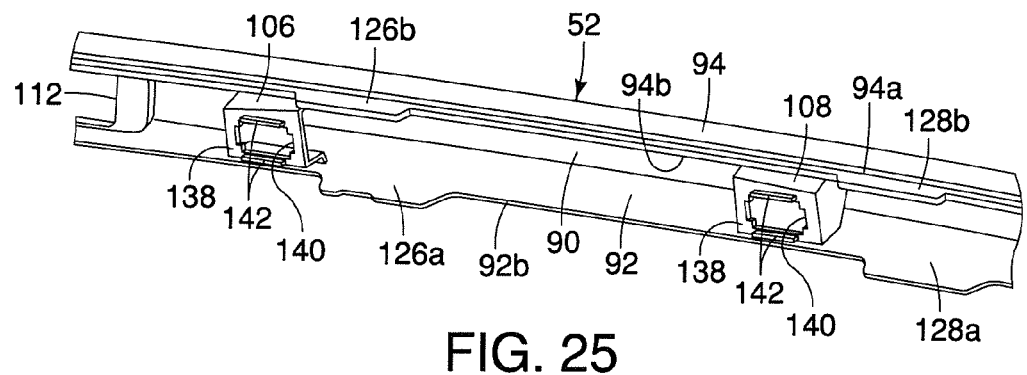
FIG. 25 is a perspective view of a third portion of the mid-section of the molding member showing two further attachment structures that extend down from the underside of the molding member in accordance with the one embodiment.
Figure 26:
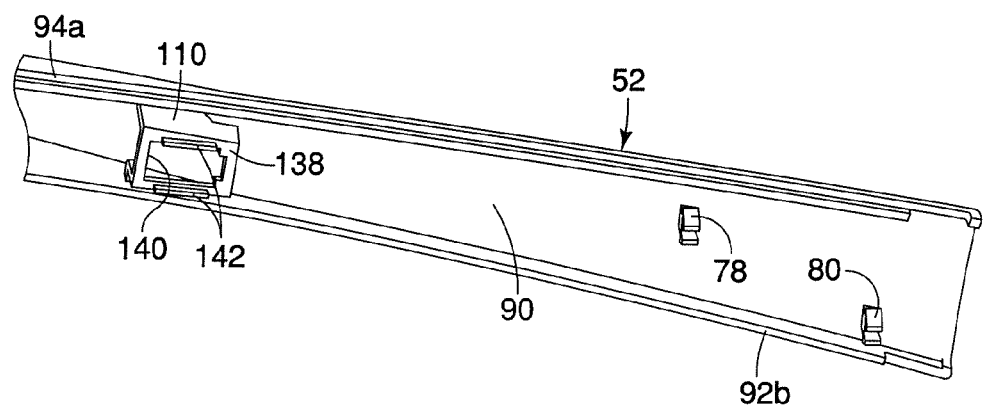
FIG. 26 is a perspective view of the rear section of the molding member showing a further attachment structure that extends down from the underside of the molding member in accordance with the one embodiment.

The first lateral side 92 and second lateral side 94 also include a plurality of downwardly extending projections 120a, 120b, 122a, 122b, 124a, 124b, 126a, 126b, 128a and 128b, as shown in FIGS. 22-27. The first lateral side 92 includes the projections 120a, 122a, 124a, 126a and 128a, and the second lateral side 94 is provided with the projections 120b, 122b, 124b, 126b and 128b. As indicated in FIGS. 21-25, the projections 120a, 120b, 122a, 122b, 124a, 124b, 126a, 126b, 128a and 128b are staggered along the lengthwise direction of the molding member 52, but are paired together. Specifically, the projections 120a and 120b are approximately aligned with one another relative to the lengthwise direction of the molding member 52, as shown in FIGS. 21, 22 and 23. The projections 122a and 122b are approximately aligned with one another relative to the lengthwise direction of the molding member 52, as shown in FIGS. 21 and 23. The projections 124a and 124b are approximately aligned with one another relative to the lengthwise direction of the molding member 52, as shown in FIGS. 21 and 24. The projections 126a and 126b are approximately aligned with one another relative to the lengthwise direction of the molding member 52, as shown in FIGS. 21 and 25. Further, the projections 128a and 128b are approximately aligned with one another relative to the lengthwise direction of the molding member 52, as shown in FIGS. 21 and 25.

The elongated sealing members 54 are installed along respective ones of the lips 92a and 94a, as indicated in FIGS. 8, 33 and 35. The elongated sealing members 54 provide a cushion between the roof ditch 14 and the molding member 52. The elongated sealing members 54 extend the length of the molding member 52. The elongated sealing members 54 include slots that receive the projections 120a, 120b, 122a, 122b, 124a, 124b, 126a, 126b, 128a and 128b. More specifically, the projections 120a, 120b, 122a, 122b, 124a, 124b, 126a, 126b, 128a and 128b extend downward through the slots formed in the sealing members 54.

Figure 30:
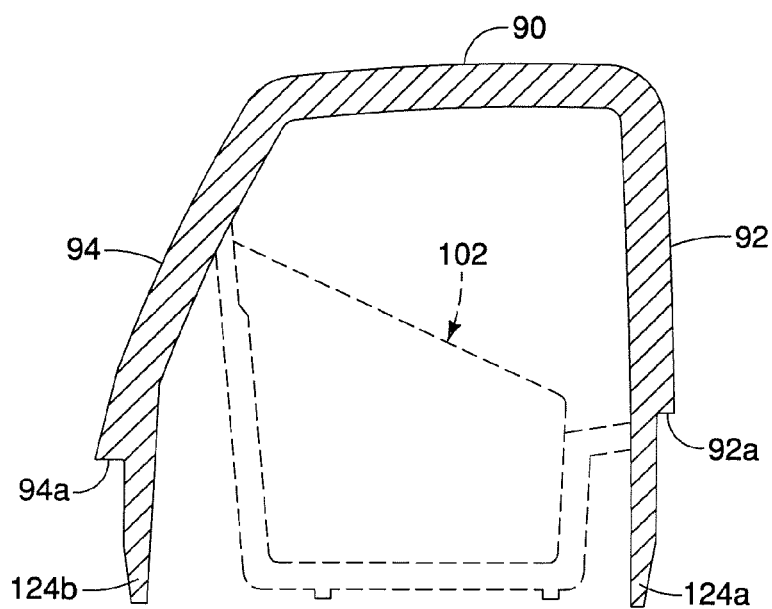
FIG. 30 is a simplified cross-sectional view of the mid-section of the molding member taken along the line 30-30 in FIG. 21 in accordance with the one embodiment.

The projections 120a through 128b are stabilizing projections that position the molding member 52 in a relatively fixed orientation within the roof ditch 14. The projections 120a, 122a, 124a, 126a and 128a extend below the lip 92a and the bottom edge 92b of the first lateral side 92. Similarly, the projections 120b, 122b, 124b, 126b and 128b extend below the lip 94a and the bottom edge 94b of the second lateral side 94. The projections 120a through 128b are further tapered in thickness, as indicated in FIGS. 30 and 31. More specifically, the projections 120a through 128b have tapering thicknesses such that upper ends of the stabilizing projections 120a through 128b are thicker than lower end of the stabilizing projections, as shown in FIGS. 30 and 31. Further, with the molding member 52 installed in the roof ditch 14, the projections 120a, 122a, 124a, 126a and 128a of the first lateral side 92 conform to shape of the inner side wall 30.

Similarly, the projections 120b, 122b, 124b, 126b and 128b of the second lateral side 94 conform to the shape of the outer side wall 32 with the molding member 52 installed to the roof ditch 14. In other words, the projections 120a, 122a, 124a, 126a and 128a of the first lateral side 30 extend downward away from the top portion 90 along the first wall surface 30 of the roof ditch 14 and the projections 120b, 122b, 124b, 126b and 128b of the second lateral side 94 extend downward away from the top portion 90 along the second wall surface 32 of the roof ditch 14. Further, the projections 120a through 128b all extend downward below respective bottom edges 92b and 94b of the first and second lateral sides 92 and 94 into contact with the recessed support surface 34 of the roof ditch 14.

Further, each of the projections 120a through 128b is provided a corresponding one of the cushions 56. The cushions 56 are included to reduce and/or prevent noise that might otherwise occur during movement of the molding member 52 relative to the roof ditch 14. More specifically, as the molding member 52 experiences thermal expansion and contraction, the cushions 56 provide a reduced friction surface that permits small amounts of movement of the molding member 52 relative to the surfaces of the roof ditch 14.

A description is now provided of the plurality of attachment structures 96, 98, 100, 102, 104, 106, 108 and 110. The attachment structures 96, 98, 100, 102, 104, 106, 108 and 110 all have structural features in common with one another but due to variations in the overall shape of the molding member 52 along its length, each of the attachment structures 96, 98, 100, 102, 104, 106, 108 and 110 can have slightly different overall dimensions. However, the general description below of the attachment structure 102 applies to each of the attachment structures 96, 98, 100, 102, 104, 106, 108 and 110.

Figure 29:
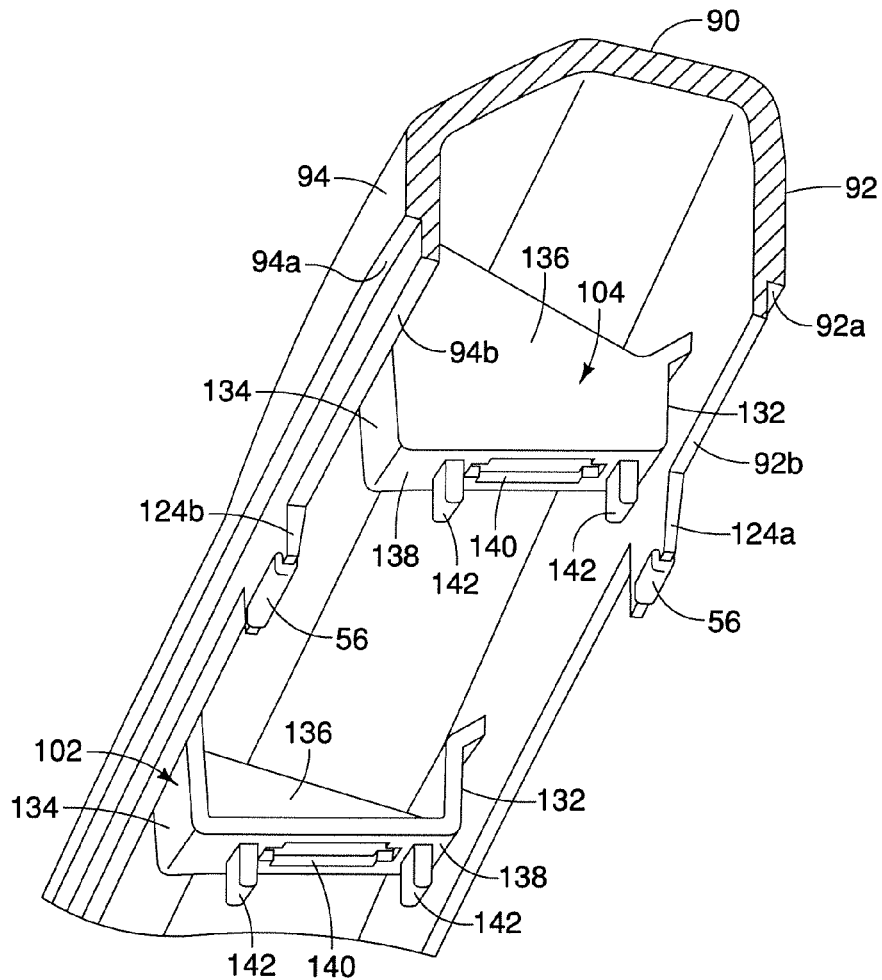
FIG. 29 is a perspective, cross-sectional view of the mid-section of the molding member taken along the line 29-29 in FIG. 5, showing two of the attachment structures with their respective projections along with the projections of the molding member in accordance with the one embodiment.

As indicated in FIGS. 29, 32 and 33, each of the attachment structures 96, 98, 100 102, 104, 106, 108 and 110 includes a first side wall 132, a second side wall 134, a lateral wall 136 extending between the first and second side walls 132 and 134 and a bottom wall 138. An upper end of the first side wall 132 is fixed to and formed integrally (molded) with the first lateral side 92 of the molding member 52. Further, an upper end of the second side wall 134 is fixed to and formed integrally (molded) with the second lateral side 94 of the molding member 52. The first side wall 132 extends downward from an upper area of the first lateral side 92 and the second side wall 134 extends downward from a mid-section of the second lateral side 94. Further, the side wall 136 extends between the first and second side walls 132 and 134, being integrally formed or molded therewith. However, as the first side wall 132 extends downward, a lower section of the first side wall 132 is spaced apart from the first lateral side 92 and the second lateral side 94. As well, as the second side wall 134 extends downward, the lower section of the second side wall 134 is spaced apart from the second lateral side 94.

The first side wall 132 and the lateral wall 136 are perpendicularly arranged relative to one another. The lateral wall 136 and the second side wall 134 are also arranged perpendicularly relative to one another, with the first and second side walls 132 and 134 facing one another. The first side wall 132, the second side wall 134 and the lateral wall 136 define an open area between the first and second side walls 132 and 134 and above the bottom wall 138.

The bottom wall 138 extends in a direction that is approximately perpendicular to each of the first, second and third side walls 132, 134 and 136. Further, the bottom wall is formed integrally (molded) with the first and second side walls 132, 134 and the lateral wall 136. The bottom wall 138 includes a slot or opening 140. The bottom wall 138 defines a lower or bottom surface that includes a pair of ribs 142. The ribs 142 extend in a lengthwise direction relative to the roof ditch 14. The ribs 142 are located on opposite lateral sides of the opening 140. The lower surface of the bottom wall 138 of each of the attachment structures are positioned vertically lower than adjacent sections of the longitudinally extending lips 92a and 94a.

A clip 144 (clip member) is snap fitted into the opening 140, as shown in FIGS. 33 and 35, for each of the attachment structures 98, 100, 102, 104, 106, 108 and 110, but not the attachment structure 96, as is explained below. The clip 144 defines an elongated slot that snap fits to a corresponding one of the fastening members 36. Hence, there is a plurality of the clips 144, one for each of the attachment structures 98, 100, 102, 104, 106, 108 and 110. The clips 144 all include mounting parts that snap fit to the bottom wall 138 at the opening 140.

It should be understood from the drawings and description herein, that the fastening members 36 shown in FIG. 5, are spaced apart from one another in alignment with the spacing between the attachment structures 98, 100, 102, 104, 106, 108 and 110. With the clips 144 installed to the openings 140 of each of the attachment structures 98, 100, 102, 104, 106, 108 and 110, the molding member 52 is installed to the roof ditch 14 by pressing down on the molding member 52, snap fitting each of the fastening members 36, one by one, into the clips 144 of each of the attachment structures 98, 100, 102, 104, 106, 108 and 110. The elongated slot of each of the clips 144 receives one the fastening members 36 extending therethrough. The elongated slots of the clips 144 extend in a direction approximately parallel to a lengthwise direction of the roof ditch 14 and are dimensioned relative to the fastening members 36 such that the molding member can undergo limited movement relative to the roof ditch. Consequently, it is possible for there to be small amounts of relative movement between the fastening members 36 and the attachment structures 98, 100, 102, 104, 106, 108 and 110 in the lengthwise direction of the roof ditch 14. More specifically, the clips 144 are configured to allow for thermal expansion and contraction of the molding member relative to the roof ditch 14.

As is indicated in FIG. 21, the attachment structure 96 is provided with a clip 146 that has a rounded opening. Consequently, once the molding member 52 is installed to the roof ditch 14, the front section 84 is fixed in position relative to the roof ditch 14 via the connection between the fastening member 36 and the clip 146 in the attachment structure 96.

As is indicated in FIGS. 21-27, the projections 120a, 120b, 122a, 122b, 124a, 124b, 126a, 126b, 128a and 128b (the stabilizing projections) of the first and second lateral sides 92 and 94 are offset from the attachment structures 96, 98, 100, 102, 104, 106, 108 and 110 (roof attachment portions) as viewed laterally with respect to a lengthwise direction along the roof ditch 14. More specifically, the projections 120a, 120b, 122a, 122b, 124a, 124b, 126a, 126b, 128a and 128b (the stabilizing projections) are longitudinally spaced apart from adjacent ones of the attachment structures 96, 98, 100, 102, 104, 106, 108 and 110 (roof attachment portions). For example, as shown in FIG. 23, the projections 120a and 120b are spaced apart from the attachment structure 98. Specifically, the projections 120a and 120b are positioned closer to the front of the vehicle 10 than the attachment structure 98. The projections 122a and 122b are also spaced apart from and are located rearward from the attachment structure 98. Further as shown in FIG. 24, the projections 124a and 124b are located between the attachment structures 102 and 104, being offset therefrom. As shown in FIG. 25, the projections 126a and 126b are located between the attachment structures 106 and 108, being offset therefrom.

Figure 27:
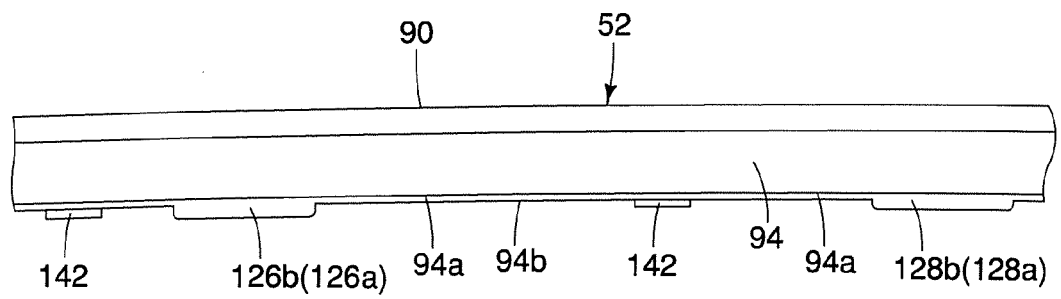
FIG. 27 is a side view of the mid-section of the molding member showing projections of the molding member and projections that extend downward from the attachment structures in accordance with the one embodiment.
Figure 28:
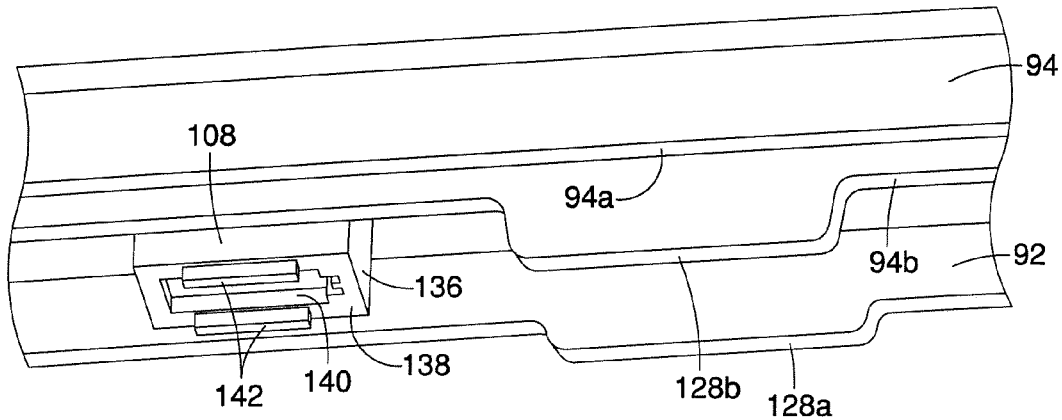
FIG. 28 is a perspective view of the mid-section of the molding member showing the projections of the molding member and the projections that extend downward from the attachment structures in accordance with the one embodiment.

As is indicated in FIGS. 27, 30 and 31, the projections 120a, 120b, 122a, 122b, 124a, 124b, 126a, 126b, 128a and 128b (the stabilizing projections) extend downward from the first and second lateral sides 92 and 94 lower than a lowermost surface of the bottom wall 138 of each of the attachment structures 96, 98, 100, 102, 104, 106, 108 and 110 (the roof attachment portions). Further, the projections 120a, 120b, 122a, 122b, 124a, 124b, 126a, 126b, 128a and 128b extend downward from the first and second lateral sides 92 and 94 lower than the ribs 142, as indicated in FIGS. 30 and 31.

However, when the molding member 52 is installed within the roof ditch 14, the ribs 142 can contact and remain in contact with the recessed support surface 34 with the molding member 52 installed to the roof ditch 14. Alternatively, the ribs 142 can be dimensioned to remain slightly spaced apart from the recessed support surface 34 with the molding member 52 installed to the roof ditch 14.

In the depicted embodiment, the molding member 52 (the top portion, the first lateral side 92 and the second lateral side 94), the snap fitting projections 78 and 80, and the attachment structures 96, 98, 100, 102, 104, 106, 108 and 110 are formed unitarily as a single monolithic element.

During assembly, the cover 50 is first attached to the hinge 24. The clips 144 and the clip 146 are installed to the attachment structures 98, 100, 102, 104, 106, 108 and 110, and the attachment structure 96, respectively. The seals 54 are installed to the lips 92a and 94a of the molding member 52. Thereafter, the molding member 52 is installed to the roof ditch 14 such that the snap fitting projections 78 and 80 are inserted into the first and second slots 74 and 76 of the cover 50; and the fastening members 36 are snap fitted into the slots or openings of the clips 144 (and 146) installed to the attachment structures 96, 98, 100, 102, 104, 106, 108 and 110 of the molding member 52. During installation, the projections 120a, 122a, 124a, 126a and 128a of the first lateral side 92 of the molding member 52 press against and conform to the shape of the inner wall surface 30 of the roof ditch 14, then contact the recessed support surface 34 of the roof ditch 14. Similarly, the projections 120b, 122b, 124b, 126b, and 128b of the second lateral side 94 of the molding member 52 press against and conform to the shape of the outer wall surface 32 of the roof ditch 14, then contact the recessed support surface 34 of the roof ditch 14.

The attachment structures 96, 98, 100, 102, 104, 106, 108 and 110 snap fitted to the fastening members 36 fixes the molding assembly 16 to the roof ditch 14. Further, contact between the projections 120a, 120b, 122a, 122b, 124a, 124b, 126a, 126b, 128a and 128b of the molding member 52 and the inner wall surface 30, the outer wall surface 32 and the recessed support surface 34 ensure a firm, non-twistable and non-rotatable installation of the molding member 52 to the roof ditch 14.

The various features of the vehicle 10, other than the above described roof ditch 14 and the molding assembly 16, are conventional components that are well known in the art. Since these various features of the vehicle 10 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
   at least one vehicle body panel including a roof ditch that is defined by a recessed support surface, a first wall surface extending longitudinally along a first side of the recessed support surface and a second wall surface extending longitudinally along a second side of the recessed support surface, with the second wall surface being disposed outboard of the first wall surface;
   a cover including a top portion that spans a width of the roof ditch between respective top edges of the first and second wall surfaces, the cover further including a cover attachment section and a molding attachment section, the cover attachment section coupling the cover at a fixed position relative to the vehicle body panel; and
   a molding member extending in a lengthwise direction along the roof ditch between the first and second wall surfaces of the roof ditch, the molding member including an attachment member mating with the molding attachment section of the cover to form a lengthwise movement connection that retains the cover to the molding member with a predetermined amount of movement along the lengthwise direction of the roof ditch.

2. The vehicle body structure according to claim 1, wherein the lengthwise movement connection includes a first slot that extends in the lengthwise direction of the roof ditch as a part of the molding attachment section of the cover, and the attachment member is movably disposed in the first slot in the lengthwise direction of the roof ditch.

3. The vehicle body structure according to claim 2, wherein the first slot is defined by the top portion of the cover.

4. The vehicle body structure according to claim 2, wherein the attachment member snap-fits into the first slot of the cover to secure the molding member to the cover.

5. The vehicle body structure according to claim 2, wherein
   the lengthwise movement connection further includes a second slot that extends in the lengthwise direction of the roof ditch as a part of the molding attachment section of the cover, and
   the lengthwise movement connection further includes an additional attachment member that is disposed on the molding member and is movably disposed in the second slot.

6. The vehicle body structure according to claim 5, wherein
   the first and second slots are laterally offset from each other with respect to the lengthwise direction of the roof ditch.

7. The vehicle body structure according to claim 5, wherein
   the first and second slots are longitudinally offset from each other with respect to the lengthwise direction of the roof ditch.

8. The vehicle body structure according to claim 5, wherein
   the attachment members snap-fits into the first and second slots of the cover to secure the molding member to the cover.

9. The vehicle body structure according to claim 5, wherein
   the first and second slots are both laterally and longitudinally offset with respect to the lengthwise direction of the roof ditch.

10. The vehicle body structure according to claim 1, further comprising
    a hinge having a base component and an arm pivotally coupled to the base component, the base component being fixedly attached to the recessed support surface at a first ditch end of the roof ditch, and
    the cover attachment section of the cover is fixedly attached to the base component of the hinge.

11. The vehicle body structure according to claim 10, wherein
    the cover further includes a close-out portion that extends from a peripheral end edge of the top portion towards the recessed support surface of the roof ditch, the close-out portion defining a slot through which the arm component of the hinge passes.

12. The vehicle body structure according to claim 11, wherein
    the close-out portion extends laterally within the roof ditch from the first wall surface to the second wall surface.

13. The vehicle body structure according to claim 10, wherein
    the cover and the roof ditch define a cavity with the base component of the hinge being situated within the cavity and the vehicle door mounting structure of the arm component being situated outside of the cavity.

14. The vehicle body structure according to claim 10, wherein
    the cover attachment section of the cover includes a clip that is received in an aperture of the base component of the hinge to retain the cover to the base component of the hinge.

15. The vehicle body structure according to claim 10, wherein
    the clip includes a projection dimensioned to snap-fit into the aperture of the base component of the hinge.

16. The vehicle body structure according to claim 1, wherein
    the attachment member includes a first snap fitting projection engaging a first surface of the cover.

17. The vehicle body structure according to claim 16, wherein
the first surface of the cover is defined within a first slot of the cover, the first snap fitting projection extending through the first slot of the cover.

18. The vehicle body structure according to claim 17, wherein
the attachment member includes a second snap fitting projection engaging a second surface of the cover.

19. The vehicle body structure according to claim 18, wherein
the second surface of the cover is defined within a second slot of the cover, the second snap fitting projection extending through the second slot of the cover.

20. The vehicle body structure according to claim 16, wherein
the attachment member includes a second snap fitting projection engaging a second surface of the cover spaced apart from the first surface.

\* \* \* \* \*